(12) United States Patent
Weisberg et al.

(10) Patent No.: US 6,563,981 B2
(45) Date of Patent: May 13, 2003

(54) ELECTROMAGNETIC MODE CONVERSION IN PHOTONIC CRYSTAL MULTIMODE WAVEGUIDES

(75) Inventors: Ori Weisberg, Cambridge, MA (US); Steven G. Johnson, Cambridge, MA (US); John D. Joannopolous, Belmont, MA (US); Michael Shapiro, Marblehead, MA (US); Yoel Fink, Cambridge, MA (US); Mihai Ibanescu, Cambridge, MA (US)

(73) Assignee: Omniguide Communications, Cambridge, MA (US)

( * ) Notice: Subject to any disclaimer, the term of this patent is extended or adjusted under 35 U.S.C. 154(b) by 0 days.

(21) Appl. No.: 10/066,234

(22) Filed: Jan. 31, 2002

(65) Prior Publication Data

US 2003/0031407 A1 Feb. 13, 2003

Related U.S. Application Data

(60) Provisional application No. 60/265,242, filed on Jan. 31, 2001, and provisional application No. 60/268,997, filed on Feb. 15, 2001.

(51) Int. Cl.⁷ .................................................. G02B 6/42
(52) U.S. Cl. ......................... 385/28; 385/126; 385/127
(58) Field of Search ............................ 385/28, 123–126

(56) References Cited

U.S. PATENT DOCUMENTS

| | | | |
|---|---|---|---|
| 4,852,968 A | 8/1989 | Reed | 385/28 |
| 5,185,827 A | 2/1993 | Poole | 385/28 |
| 5,261,016 A | 11/1993 | Poole | 385/28 |

(List continued on next page.)

FOREIGN PATENT DOCUMENTS

| | | |
|---|---|---|
| EP | 0 060 085 | 9/1982 |
| EP | 0 195 630 | 9/1986 |
| EP | 0 426 203 | 5/1991 |
| GB | 2288469 | 10/1995 |
| JP | 2000-035521 | 2/2000 |
| JP | 2001-051244 | 2/2001 |
| WO | WO 94/09393 | 4/1994 |
| WO | WO 94/16345 | 7/1994 |
| WO | WO 97/01774 | 1/1997 |
| WO | WO 99/47465 | 9/1999 |
| WO | WO 99/49340 | 9/1999 |
| WO | WO 99/49341 | 9/1999 |
| WO | WO 00/22466 | 4/2000 |
| WO | WO 00/51268 | 8/2000 |
| WO | WO 00/51269 | 8/2000 |
| WO | WO 00/77549 | 12/2000 |
| WO | WO 01/69295 | 9/2001 |

OTHER PUBLICATIONS

A. G. Bulushev et al. "Spectrally selective mode conversions at in homogeneities of optical fibers," Sov. Tech. Phys. Lett., 14, 506–507 (1988).

A. N. Lazarchik, "Bragg fiber lightguides," Radiotekhnika i electronika, 1, 36–43 (1988).

(List continued on next page.)

Primary Examiner—Phan T. H. Palmer
(74) Attorney, Agent, or Firm—Fish & Richardson P.C.

(57) ABSTRACT

A method for converting electromagnetic (EM) energy between guided modes of a photonic crystal waveguide having a waveguide axis, the method including: (i) providing the photonic crystal waveguide with a mode coupling segment comprising at least one bend in the waveguide axis, wherein during operation the mode coupling segment converts EM. energy in a first guided mode to a second guided mode; (ii) providing EM energy in the first guided mode of the photonic crystal waveguide; and (iii) allowing the EM energy in the first guided mode to encounter the mode coupling segment to convert at least some of the EM energy in the first guided mode to EM energy in the second guided mode.

50 Claims, 10 Drawing Sheets

U.S. PATENT DOCUMENTS

| | | | |
|---|---|---|---|
| 5,448,674 A | 9/1995 | Vengsarkar et al. | 385/123 |
| 5,641,956 A * | 6/1997 | Vengsarkar et al. | 385/28 X |
| 5,661,839 A | 8/1997 | Whitehead | 385/131 |
| 5,802,236 A * | 9/1998 | DiGiovanni et al. | 385/127 |
| 5,814,367 A | 9/1998 | Hubbard et al. | 427/162 |
| 5,882,774 A | 3/1999 | Jonza et al. | 428/212 |
| 5,894,537 A | 4/1999 | Berkey et al. | 385/123 |
| 5,995,696 A | 11/1999 | Miyagi et al. | 385/125 |
| 6,043,914 A | 3/2000 | Cook et al. | 359/124 |
| 6,044,191 A | 3/2000 | Berkey et al. | 385/123 |
| 6,154,318 A | 11/2000 | Austin et al. | 359/584 |
| 6,175,671 B1 | 1/2001 | Roberts | 385/14 |
| 6,301,421 B1 | 10/2001 | Wickham et al. | 385/126 |
| 6,334,017 B1 | 12/2001 | West | 385/123 |
| 6,334,019 B1 | 12/2001 | Birks et al. | 385/125 |
| 6,380,551 B2 | 4/2002 | Abe et al. | 257/15 |
| 6,389,197 B1 * | 5/2002 | Iltchenko et al. | 385/28 |
| 6,404,966 B1 | 6/2002 | Kawanishi et al. | 385/28 |
| 6,426,667 B1 | 6/2002 | Kawanishi et al. | 385/125 |
| 2002/0039046 A1 | 4/2002 | Lipson et al. | 330/56 |

OTHER PUBLICATIONS

C. M. de Sterke et al., "Differential losses in Bragg fibers," J. Appl. Phys., 76, 680–688 (1994).

C. Moeller, "Mode converters in the Doublet III ECH microwave system," Int. J. Electronics, 53, 587–593 (1982).

D. Marcuse et al., "Mode conversion caused by diameter changes of a round dielectric waveguide," Bell Syst. Tech. J., 48, 3217–3232 (1969).

D. Marcuse, "Theory of dielectric optical waveguides," (Academic, New York, 1974).

E. Luneville et al., "An original approach to mode converter optimum design," IEEE Trans. Microwave Theory Tech., 46, (1998).

K. O. Hill et al., "Efficient mode conversion in telecommunication fiber using externally written gratings," Electron Lett., 26, 1270–1272 (1990).

L. Dong et al., "Intermodal coupling by periodic microbending in dual–core fibers—comparison of experiment and theory," J. Lightwave Tech., 12, 24–27 (1994).

L. Gruner–Nielson et al., "Dispersion compensating fibers," Optical Fiber Tech., 6, 164–180 (2000).

L. M. Field, "Some slow–wave structures for traveling––wave tubes," Proc. IRE, 37, 34–40 (1949).

Lars Gruner–Nielson et al., "New dispersion compensating fiberes for simultaneous compensation of dispersion and dispersion slope of non–zero dispersion shifted fibers in the C or L bad", OFC '00.

M. Ibanescu et al., "An all–dielectric coaxial waveguide," Science, 289, 415–419 (2000).

M. J. Buckley et al., "A single period $TE_{02}$–$TE_{01}$ mode converter in a highly overmoded circular waveguide," IEEE Trans. Microwave Theory Tech., 39, 1301–1306 (1991).

M. J. Weber et al., "Measurements of the electronic and nuclear contributions to the nonlinear refractive index of beryllium fluoride glasses," Appl. Phys. Lett., 32, 403–405 (1978).

M. Miyagi, et al., "Transmission characteristics of dielectric–coated metallic waveguides for infrared transmission: slab waveguide model", IEEE J. Quantum Elec. QE–19, 136–145 (1983).

M. Miyagi, et al., "Wave propagation and attenuation in the general class of circular hollow waveguides with uniform curvature", IEEE Trans. Microwave Theory Tech. MTT–32, 513–521 (1984).

M. Otsuka et al., "Development of mode converters for 28 GHz electron cyclotron heating system," Int. J. Electron, 70, 989–1004 (1991).

M. Thumm, "High power millimeter–wave mode converters in overmoded circular waveguides using periodic wall perturbations," Int. J. Electron., 57, 1225–1246 (1984).

Mitsunobu Miyagi et al., "Design theory of dielectric––coated circular metallic waveguides for infrared transmission," J. Lightwave Tech., vol. LT–2, 116–126, Apr. 1984.

N. J. Doran et al., "Cylindrical Bragg fibers: a design and feasibility study for optical communications," J. Lightwave Tech., 1, 588–590 (1983).

Pochi Yeh et al., "Theory of Bragg fiber," J. Opt. Soc. Am., vol. 68, 1196–1201 Sep. 9, 1978.

R. F. Cregan et al., "Single–mode photonic band gap guidance of light in air," Science, 285, 1537–1539 (1999).

R.A. Abram et al., "Mode conversion in an imperfect waveguide," J. Phys. A, 6, 1693–1708 (1973).

S. Ahn et al., "Analysis of helical waveguide," IEEE Trans. Electron Devices, 33, 1348–1355 (1986).

S. H. Yun et al., "All–fiber tunable filter and laser based on two–mode fiber," Opt. Lett., 21, 27–29 (1996).

S.P. Morgan, "Theory of curved circular waveguide containing an inhomogeneous dielectric," Bell Syst. Tech. J., 36, 1209–1251 (1957).

T. Cardinal et al., "Nonlinear optical properties of chalcogenide glasses in the system As–S–Se," J. Non–Cryst. Solids, 256, 353–360 (1999).

T. Iyama et al., Propagation characteristics of a dielectric–coated coaxial helical waveguide in a lossy medium, IEEE Trans. Microwave Theory Tech., 45, 557–559 (1997).

E. Mao et al., "Wavelength–selective semiconductor in–line fibre photodetectors," Electronics Letters, vol. 36, No. 6, pp. 515–516, Mar. 16, 2000.

E. Marcatti et al., "Hollow metallic and dielectric waveguides for long distance optical transmission and lasers," Bell Syst. Tech. J., 43, 1783–1809 (1964).

E. Peral et al., "Supermodes of grating–coupled multimode waveguides and application to mode conversion between coprogating modes mediated by backward Bragg scattering," J .Lightwave Tech., 17, 942–947 (1999).

F. Brechet et al., "Analysis of bandpass filtering behavior of singlemode depressed–core–index photonic bandgap fibre," Elec. Lett., 36, 870–872 (2000).

F. Brechet et al., "Singlemode propagation into depressed–core–inded photonic–bandgap fibre designed for zero–dispersion propagation at short wavelengths," Elec. Lett., 36, 514–515 (2000).

G. H. Childs, "50mm diameter $TE_{01}$ mode helical waveguide optimization," Electronics Lett., 14, 140–141 (1978).

H. F. Taylor, "Bending effects in optical fibers," J. Lightwave Tech., 2, 617–628 (1984).

H. Kumric et al., "Optimized overmoded $TE_{01}$–to–$TM_{11}$ mode converters for high–power millimeter wave applications at 70 and 140 GHz," Int. J. Infrared Millim. Waves, 7, 1439–1463 (1986).

H. Kumric et al., "Optimization of mode converters for generating the fundamental $TE_{01}$ mode from $TE_{06}$ gyrotron output at 140 GHz," Int. J. Electron, 64, 77–94 (1988).

H. Yajima, "Dielectric bypass waveguide mode order converter," IEEE J. Quantum Electronics, 15, 482–487 (1979).

I. Gannot, et al., "Current Status of Fexible Waveguides for IR Laser Radiation Transmission", IEEE J. Sel. Topics in Quantum Electr., IEEE Service Center, vol. 2, No. 4, pp. 880–888 (Dec. 1996); XP000694378.

I. K. Hwang et al., "Long–period fiber gratings based on periodic microbends," Opt. Lett., 24, 1263–1264 (1999).

I. Ogawa et al., "Design of a quasi–optical mode conversion system with variable output beam size," Int. J. Electron., 87, 457–467 (2000).

J. A. Harrington, "A review of IR transmitting, hollow waveguides", Fiber Integr. Opt. 19, 211–227 (2000).

J.C. Knight et al., "Photonic band gap guidance in optical fibers" Science 282, 1476–1478 (1998).

J. J. Refi, "Optical fibers for optical networking," Bell Labs Technical Journal, 4,246–261 (1999).

J. N. Blake et al., "Fiber–optic modal coupler using periodic microbending," Opt;. Lett., 11, 177–179 (1986).

J. S. Levine, "Rippled wall mode converters for circular waveguide," Int. J. Infrared Milim. Waves, 5, 937–952 (1984).

J.L. Auguste et al., "–1800ps/(nm–km) chromatic dispersion at 1.55$\mu$m in dual concentric core fiber", Elec. Lett., $28^{th}$ Sep. 2000, vol. 36, No. 20.

J.W. Hahn et al., "Measurement of nonreasonant third–order susceptibilities of various gases by the nonlinear interferometric technique," J. Opt. Soc. Am. B, 12, 1021–1027 (1995).

K. J. Bunch et al., "The helically wrapped circular waveguide," IEE Trans. Electron Devices, 34, 1873–1884 (1987).

T. Kawanishi et al., "Coaxial periodic optical waveguide," Optics Express, 7, 10–22 (2000).

T. Liang et al., "Mode conversion of ultrafast pulses by grating structures in layered dielectrics waveguides," J. Lightwave Tech., 15, 1966–1973 (1997).

T. M. Monro et al., "Holey Optical Fibers: An efficient modal model," IEEE J. Lightwave Technol., 17, 1093–1102 (1999).

T. ul Hag et al., "Optimized irregular structures for spatial– and temproal–field transformation," IEEE Trans. Microwave Theory Tech., 46, 1856–1867 (1998).

W. Lawson et al., "The design of serpentine–mode converters for high–power microwave applications," IEEE Trans. Microwave Theory Tech., 48, 809–814 (May 2000).

Y. Fink et al., "A dielectric omnidirectional reflector," Science, 282, 1679–1682 (1998).

Y. Fink et al., "Guiding optical light in air using an all–dielectric structure," J. Lightwave Tech., 17, 2039–2041 (1999).

Y. W. Li et al., "Triple–clad single–mode fibers for dispersion shifting," IEEE J. Lightwave Technol., 11, 1812–1819 (1993).

Y. Xu et al., "Asymptotic analysis of Bragg fibers and dielectric coaxial fibers," In Proc. SPIE, A. Dutta, A. A. S. Awwal, N. K. Dutta, and K. Okamoto, eds., 4532, 191–205 (2001).

Yong Xu et al., "Asymptotic analysis of Bragg fibers," Optics Lett., vol. 25, No. 24, pp. 1756–1758 Dec. 15, 2000.

* cited by examiner

DIELECTRIC WAVEGUIDE          HOLLOW METALLIC WAVEGUIDE

ELECTROMAGNETIC MODE CONVERSION IN PHOTONIC CRYSTAL MULTIMODE WAVEGUIDES

CROSS-REFERENCE TO RELATED APPLICATIONS

This application claims priority to U.S. provisional patent applications No. 60/265,242 filed Jan. 31, 2001 and U.S. Ser. No. 60/268,997 filed Feb. 15, 2001, the contents of which are incorporated herein by reference.

BACKGROUND

This invention relates to the field of dielectric optical waveguides and optical telecommunications.

Optical waveguides guide optical signals to propagate along a preferred path or paths. Accordingly, they can be used to carry optical signal information between different locations and thus they form the basis of optical telecommunication networks. The most prevalent type of optical waveguide is an optical fiber based on index guiding. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts of up to about 2–3% for wavelengths in the range of 1.5 microns.

Signals traveling down an optical fiber slowly attenuate, necessitating periodic amplification and/or regeneration, typically every 50–100 km. Such amplifiers are costly, and are especially inconvenient in submarine cables where space, power sources, and maintenance are problematic. Losses for silica-based optical fibers have been driven down to about 0.2 dB/km, at which point they become limited by the Rayleigh scattering processes. Rayleigh scattering results from microscopic interactions of the light with the medium at a molecular scale and is proportional to $\omega^4\rho$, where $\omega$ is the light frequency and $\rho$ is the material density, along with some other constants of the material.

In addition to loss, signals propagating along an optical fiber may also undergo nonlinear interactions. In an ideal linear material, light does not interact with itself—this is what allows a fiber to carry multiple communications channels simultaneously in separate wavelengths (wavelength-division multiplexing, or WDM), without interactions or crosstalk. Any real optical medium (even vacuum), however, possesses some nonlinear properties. Although the nonlinearities of silica and other common materials are weak, they become significant when light is propagated over long distances (hundreds or thousands of kilometers) or with high powers. Such nonlinear properties have many undesirable effects including: self/cross phase modulation (SPM/XPM), which can cause increased pulse broadening and limit bitrates; and afour-wave mixing (FWM) and stimulated Raman/Brillouin scattering (SRS/SBS), which induce crosstalk between different wavelength channels and can limit the number of achievable channels for WDM. Such nonlinearities are a physical property of the material in the waveguide and typically scale with the density of the waveguide core.

Typically, optical fibers used for long-distance communications have a core small enough to support only one fundamental mode in a desired frequency range, and therefore called "single-mode" fibers. Single mode operation is necessary to limit signal degradation caused by modal dispersion, which occurs when a signal can couple to multiple guided modes having different speeds. Nonetheless, the name "single-mode" fiber is something of a misnomer. Actually, single-mode fibers support two optical modes, consisting of the two orthogonal polarizations of light in the fiber. The existence and similarity of these two modes is the source of a problem known as polarization-mode dispersion (PMD). An ideal fiber would possess perfect rotational symmetry about its axis, in which case the two modes would behave identically (they are "degenerate") and cause no difficulties. In practice, however, real fibers have some acircularity when they are manufactured, and in addition there are environmental stresses that break the symmetry. This has two effects, both of which occur in a random and unpredictable fashion along the fiber: first, the polarization of light rotates as it propagates down the fiber; and second, the two polarizations travel at different speeds. Thus, any transmitted signal will consist of randomly varying polarizations which travel at randomly varying speeds, resulting in PMD: pulses spread out over time, and will eventually overlap unless bit rate and/or distance is limited. There are also other deleterious effects, such as polarization-dependent loss. Although there are other guided modes that have full circular symmetry, and thus are truly "singlet" modes, such modes are not the fundamental modes and are only possible with a core large enough to support multiple modes. In conventional optical fibers, however, the PMD effects associated with the fundamental mode of a small core supporting only a "single-mode" are far preferable to the effects of modal dispersion in a larger core multi-mode fiber.

Another problem with directing optical signals along an optical waveguide is the presence of chromatic or group-velocity dispersion in that waveguide. Such dispersion is a measure of the degree to which different frequencies of the guided radiation propagate at different speeds (i.e., group velocities) along the waveguide axis. Because any optical pulse includes a range of frequencies, dispersion causes an optical pulse to spread in time as its different frequency components travel at different speeds. With such spreading, neighboring pulses or "bits" in an optical signal may begin to overlap and thereby degrade signal detection. Thus, absent compensation, dispersion over an optical transmission length places an upper limit on the bit-rate or bandwidth of an optical signal.

Chromatic dispersion includes two contributions: material dispersion and waveguide dispersion. Material dispersion comes from the frequency-dependence of the refractive index of the material constituents of the optical waveguide. Waveguide dispersion comes from frequency-dependent changes in the spatial distribution of a guided mode. As the spatial distribution of a guided modes changes, it sample different regions of the waveguide, and therefore "sees" a change in the average index of the waveguide that effectively changes its group velocity. In conventional silica optical fibers, material dispersion and waveguide dispersion cancel each other out at approximately 1310 nm producing a point of zero dispersion. Silica optical fibers have also been modified to move the zero dispersion point to around 1550 nm, which corresponds to a minimum in material absorption for silica.

Unfortunately, while operating at zero dispersion minimizes pulse spreading, it also enhances nonlinear interactions in the optical fiber such as four wave mixing (FWM) because different frequencies remain phase-matched over large distances. This is particularly problematic in wavelength-division multiplexing (WDM) systems where multiple signals are carried at different wavelengths in a common optical fiber. In such WDM systems, FWM introduces cross talk between the different wavelength channels as described above. To address this problem, WDM systems transmit signals through optical fibers that introduce a sufficient dispersion to minimize cross-phase modulation, and thereafter transmits the signals through a "dispersion compensating fiber" (DCF), to cancel the original dispersion and minimize pulse spreading in the compensated signal. Unfortunately, aggregate interactions between the dispersion and other nonlinear processes such as self-phase modulation can complicate dispersion compensation.

Another type of waveguide fiber, one that is not based on TIR index-guiding, is a Bragg fiber, which includes multiple dielectric layers surrounding a core about a waveguide axis. The multiple layers form a cylindrical mirror that confines light to the core over a range of frequencies. The multiple layers form what is known as a photonic crystal, and the Bragg fiber is an example of a photonic crystal fiber.

Another issue in optical telecommunications system is the coupling of EM energy into, and out of, optical waveguides. Optical waveguides, such as the TIR optical fibers and photonic crystal fibers described above, support EM propagation in one or more guided "modes," which are stable EM wave patterns of the waveguide. The coupling efficiency between a given mode of a first waveguide and a given mode of a second waveguide (or some other optical component) is proportional to the degree to which the modes spatially overlap. To optimize coupling efficiency, some telecommunications system include separate mode converter modules, which receive light from a first component and alter its spatial profile of the light to improve coupling efficiency into a second component. For example, the mode converter module may include an active component such as an electronically addressable spatial light modulator.

SUMMARY

The invention features a method for converting EM energy in one mode of a photonic crystal waveguide to another mode of the photonic crystal waveguide. Unlike the mode converter module described above, the mode conversion of the present invention takes place within a common waveguide supporting multiple guided modes. The photonic crystal waveguide includes one or more mode coupling segments that each include at least one bend in the waveguide axis. For example, the mode coupling segment may include one bend, multiple bends, a helical bend, a serpentine bend, or some combination thereof. The bend(s) in the mode coupling segment introduces a perturbation to an otherwise nominally straight waveguide, and the parameters of the bend(s) (e.g., its radius and angular extent) can be selected to cause the perturbation to couple EM energy from one guided mode to another. While the mode coupling segment corresponds to one or more bends of the waveguide along its waveguide axis, the dielectric profile cross-section of the waveguide about the waveguide axis can remain uniform. In other words, the mode conversion does not require a variation in the dielectric cross-section along the waveguide axis.

Because the EM energy can be converted between the multiple modes of the waveguide, certain modes may be used to optimize coupling into and/or out of the waveguide, while different modes may be used for propagation within the waveguide. For example, as explained further below, a particularly low-loss mode for a cylindrical Bragg fiber is $TE_{01}$. However, the $TE_{01}$ mode does not couple well to linearly polarized light because it has azimuthal symmetry and an electric field distribution that is maximized at a distance from the core center. Thus, by introducing a bend into the Bragg fiber having suitable parameters, linearly polarized light could be coupled into the fiber as a mode that does overlap well with linearly polarized light (e.g., the superposition of $EH_{11}$ and $EH_{1-1}$), and then the bend in the fiber can convert the EM energy from that first mode to the $TE_{01}$ mode for subsequent propagation in the fiber. Likewise, another bend may be used to convert the EM energy from the $TE_{01}$ mode to another mode when coupling the EM energy out of the fiber. Such mode conversion may be useful when, for example, the Bragg fiber is used for long-distance transmission or when, for example, it is used for dispersion compensation.

Furthermore, such mode conversion can provide specificity with respect to the polarization of the light emerging from the fiber. For example, when a bend is used to convert EM energy from the $TE_{01}$ mode to the $EH_{11}$ mode (or a superposition of $EH_{11}$ and $EH_{1-1}$) of near the output of the fiber, the light will emerge linearly polarized perpendicular to the plane of the bend. Conversely, similar polarization sensitivity applies when converting linearly polarized input light to the $TE_{01}$, i.e., the bend should be oriented with respect to the direction of linear polarization. Such polarization specificity can be an advantage coupling into or from other polarization-sensitive devices. In contrast, for example, PMD in conventional optical fibers can randomize the polarization of output light.

We will now summarize different aspects, features, and advantages of the invention.

In general, in one aspect, the invention features a method for converting electromagnetic (EM) energy between guided modes of a photonic crystal waveguide having a waveguide axis. For example, the photonic crystal waveguide may be a photonic crystal fiber (e.g., a Bragg fiber). The method includes: (i) providing the photonic crystal waveguide with a mode coupling segment including at least one bend in the waveguide axis, wherein during operation the mode coupling segment converts EM energy in a first guided mode to a second guided mode over a first range of frequencies; (ii) providing EM energy in the first range of frequencies in the first guided mode of the photonic crystal waveguide; and (iii) allowing the EM energy in the first guided mode to encounter the mode coupling segment to convert at least some of the EM energy in the first guided mode to EM energy in the second guided mode.

Embodiments of the mode conversion method may include any of the following features.

Providing EM energy in the first guided mode may include coupling EM energy into the photonic crystal waveguide as the first guided mode. Furthermore, the photonic crystal waveguide may include a second mode coupling segment including at least one bend in the waveguide axis. During operation the second mode coupling segment may convert EM energy in the second guided mode to a third guided mode over the first range of frequencies, and the method may further include allowing the EM energy in the second guided mode to encounter the second mode coupling segment to convert at least some of the EM energy in the second guided mode to EM energy in the third guided mode. The method may further include coupling at least some of the EM energy in the third guided mode out of the photonic crystal waveguide. For example, the first and third guided modes are substantially similar (e.g., they may be substantially linearly polarized).

The method may further include coupling at least some of the EM energy in the second guided mode out of the photonic crystal waveguide.

The mode coupling segment may provide a conversion efficiency of the EM energy in the first guided mode to the EM energy in the second guided mode of greater than 10%, greater than 15%, greater than 25%, or greater than 50%.

The photonic crystal waveguide may have cylindrical symmetry about the waveguide axis. As a result, the guided modes may have an angular dependence that can be expressed as a linear combination of $\exp(im\phi)$ and $\exp(-im\phi)$, where $\phi$ is the angle in cylindrical coordinates and m is an integer and provides an angular momentum index for the guided modes. In such a case, the first and second guided modes may have angular momentum indices that differ by one. For example, one of the first and second guided modes may be a TE mode, and the other of the first and second guided modes may have a substantially linear polarization (e.g., it may be a superposition of $EH_{l,m}$ and $EH_{l,-m}$ or a superposition of $HE_{l,m}$ and $HE_{l,-m}$).

The bend in the mode coupling segment may have a radius R and a bend angle $\theta$ sufficient to convert the EM energy in the first guided mode to the EM energy in the second guided mode. For example, the mode coupling segment may include only the one bend. Furthermore, the radius R of the bend in the mode coupling segment may be substantially constant. In addition, the bend radius R may be within an order of magnitude of the absolute value of $2\pi(\Delta\beta_{12})^{-1}$, where $\Delta\beta_{12}$ is the difference in wavevector between the first guided mode and the second guided mode at a frequency in the first frequency range.

The absolute value of the difference in wavevector $\Delta\beta_{12}$ between the first guided mode and the second guided mode of the EM energy at a frequency in the first frequency range may be smaller than the absolute value of the difference in wavevector $\Delta\beta_{ln}$ between any other pair of the guided modes at that frequency.

The radius R of the bend in the mode coupling segment may vary along the waveguide axis.

The mode coupling segment may include a helix in the waveguide axis, the helix including the at least one bend. For example, the helix may be expressed in Cartesian coordinates as $(R\cos\theta, R\sin\theta, R\gamma\theta)$, where R is the radius of the bend, $\gamma$ gives the rise rate of the helix in dimensionless units, and $\theta$ is the azimuthal coordinate of the helix. The rise rate $\gamma$ may be substantially constant or it may vary. The radius of the bend R and the rise rate $\gamma$ can be selected based on the absolute difference in wavevector $\Delta\beta_{12}$ between the first guided mode and the second guided mode at a frequency in the first frequency range. Furthermore, the photonic crystal waveguide may have cylindrical symmetry about the waveguide axis, in which case the guided modes have an angular dependence that can be expressed as a linear combination of $\exp(im\phi)$ and $\exp(-im\phi)$, where $\phi$ is the angle in cylindrical coordinates and m is an integer and provides an angular momentum index for the guided modes. In this case, the radius of the bend R and the rise rate $\gamma$ may be selected such that the absolute value of the expression $\Delta\beta_{lm}-\Delta m_{lm}(\gamma/R\sqrt{1+\gamma^2})$ for guided modes l and m is smaller for the first and second guided modes than that for any other pair of the guided modes for a frequency in the first range of frequencies, where $\Delta\beta_{lm}$ is difference in wavevector between guided modes l and m and $\Delta m_{lm}$ is the difference in angular momentum index for guided modes l and m.

The mode coupling segment may include a serpentine bend in the waveguide axis, the serpentine bend including the at least one bend. In particular, the serpentine bend may include multiple coplanar bends defining a varying radius of curvature for the waveguide axis in the mode coupling segment. For example, the varying radius of curvature may be oscillatory, or even periodic.

In some embodiments, the serpentine bend can be expressed as $1/R = \sin(2\pi z/\Lambda)/R_0$, where R is the instantaneous radius of the waveguide axis along the serpentine bend, $R_0$ is the radius of the maximum curvature for the serpentine bend, $\Lambda$ is the pitch of the serpentine bend, and z is the coordinate along the waveguide axis. In such cases, the radius of maximum curvature $R_0$ and the pitch $\Lambda$ of the serpentine bend may be selected such that the absolute value of one of the expressions $\Delta\beta_{lm} \pm 2\pi/\Lambda$ for guided modes l and m is smaller for the first and second guided modes than that for any other pair of the guided modes for a frequency in the first range of frequencies, where $\Delta\beta_{lm}$ is difference in wavevector between guided modes l and m.

The photonic crystal waveguide may have a uniform cross-section with respect to the waveguide axis.

The photonic crystal waveguide may include a dielectric confinement region surrounding the waveguide axis, and a dielectric core region extending along the waveguide axis and surrounded by the confinement region about the waveguide axis, wherein the confinement region includes a photonic crystal having at least one photonic bandgap and during operation the confinement region guides EM radiation in a first range of frequencies to propagate along the waveguide axis. For example, the average refractive index of the core may be less than 1.1 (e.g., the core may be hollow). The photonic crystal waveguide may further includes a dielectric dispersion tailoring region surrounded by the confinement region about the waveguide axis, wherein the presence of the dispersion tailoring region causes a guided core mode to form a working mode that penetrates into the dispersion tailoring region for at lease one subset of frequencies within the first range of frequencies. In any case, the confinement region may includes at least two dielectric materials having refractive indices that differ by at least 10%. Furthermore, the confinement region may include a plurality of higher index dielectric layers and a plurality of lower index dielectric layers alternating with one another to surround the core about the waveguide axis.

In an alternate description, the photonic crystal waveguide may include a dielectric core region extending along the waveguide axis, and a first set of at least three dielectric layers surrounding the core about the waveguide axis, the difference in refractive index between successive layers in the first set changing sign with each subsequent layer in the first set, wherein the first set of layers guides EM radiation in the first range of frequencies to propagate along the waveguide axis. The photonic crystal waveguide may further include at least one additional dielectric layer positioned between the core and the first set of layers, wherein the thickness of the additional dielectric layer differs from that of each of any three consecutive layers in the first set of layers by more than 10%.

The method may further include coupling at least some of the EM energy in the second guided mode out of the photonic crystal waveguide into a polarization sensitive device.

The first range of frequencies may correspond to wavelengths within the range of about 1.2 microns to 1.7 microns, or within the range of about 0.7 microns to 0.9 microns.

In general, in another aspect, the invention features a photonic crystal waveguide having multiple guided modes. For example, the photonic crystal waveguide may be a photonic crystal fiber (e.g., a Bragg fiber). The waveguide includes: (i) a dielectric confinement region surrounding a waveguide axis, the confinement region including a photonic crystal having at least one photonic bandgap, during operation the confinement region guides EM radiation in a first range of frequencies to propagate along the waveguide axis; a dielectric core region extending along the waveguide axis and surrounded by the confinement region about the waveguide axis; and (ii) a mode coupling segment including at least one bend in the waveguide axis, wherein during operation the mode coupling segment converts EM energy in a first guided mode to a second guided mode.

Embodiments of the photonic crystal waveguide having the mode coupling segment may include any of the features described above in connection with the mode conversion method.

In general, in another aspect, the invention features an optical telecommunications system including: a source module providing EM energy; and a photonic crystal waveguide coupled to the source module and having a waveguide axis, the photonic crystal waveguide having a mode coupling segment including at least one bend in the waveguide axis, wherein during operation the mode coupling segment converts EM energy in a first guided mode derived from the source module to a second guided mode for a first range of frequencies.

Embodiments of the telecommunications system may include any of the features described above in connection with the mode conversion method.

Unless otherwise defined, all technical and scientific terms used herein have the same meaning as commonly understood by one of ordinary skill in the art to which this invention belongs. In case of conflict with any publications, patent applications, patents, and other references incorporated herein by reference, the present specification, including definitions, will control. In addition, the materials, methods, and examples are illustrative only and not intended to be limiting.

Additional features, objects, and advantages of the invention will be apparent from the following detailed description and drawings, and from the claims.

DESCRIPTION OF DRAWINGS

The invention will now be further described merely by way of example with reference to the accompanying drawings in which.

DETAILED DESCRIPTION

The invention features a method for converting EM energy in one mode of a photonic crystal waveguide to another mode of the photonic crystal waveguide by introducing a mode coupling segment in the waveguide including at least one bend in the waveguide axis. The invention also features a photonic crystal waveguide having a mode coupling segment including at least one bend in the waveguide axis, wherein during operation the mode coupling segment converts EM energy in a first guided mode to a second guided mode. The efficiency of the mode conversion may be, for example, greater than 10%, greater than 20%. or greater than 50%.

Figure 8:
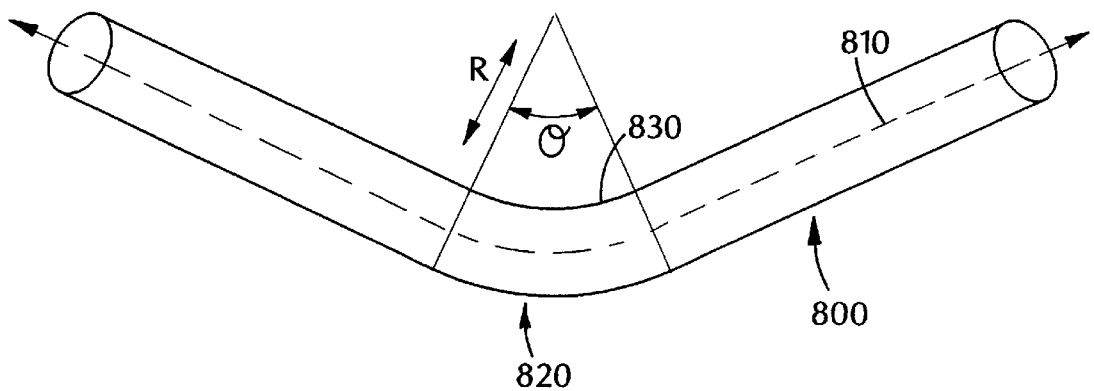
FIG. 8 is a plan view of a photonic crystal waveguide 1000 having a mode coupling segment 1020.

Referring to FIG. 8, a photonic crystal waveguide (e.g., a fiber) 800 extends along a waveguide axis 810 and supports multiple guided modes. Waveguide 800 includes a mode coupling segment 820 including at least one bend in the waveguide axis. For example, the mode coupling segment may include one bend, multiple bends, a helical bend, a serpentine bend, or some combination thereof. The bend(s) in the mode coupling segment introduces a perturbation to an otherwise nominally straight waveguide, and the parameters of the bend(s) (e.g., its radius and angular extent) can be selected to cause the perturbation to couple EM energy from one guided mode to another. In the embodiment, shown in FIG. 8, mode coupling segment 820 includes only one bend 830 having a radius of curvature R and a bend angle $\theta$ selected to optimize conversion from one mode to another, e.g., from $TE_{01}$ to $EH_{11}$ (or a superposition of $EH_{11}$ and $EH_{1-1}$). The mode conversion mechanism will be described in greater detail further below. First we describe some general features of photonic crystal waveguides.

Basic Structure of a Photonic Crystal Waveguide

Figure 1:
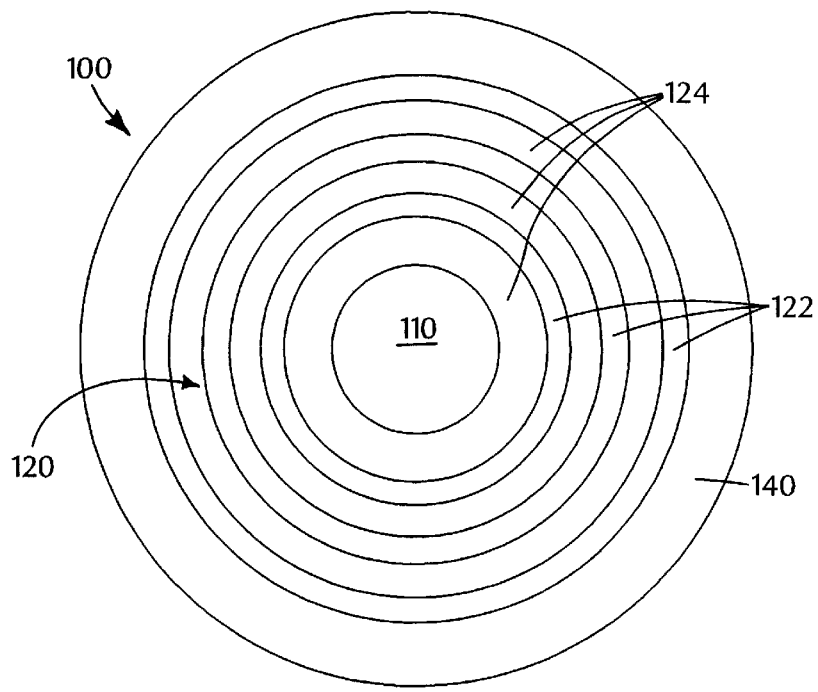
FIG. 1 is a schematic diagram of the cross-section of a photonic crystal waveguide fiber 100.

The cross-section of a photonic crystal waveguide 100 is shown in FIG. 1 and includes a dielectric core 110 extending along a waveguide axis and a dielectric confinement region 120 surrounding the core. In the embodiment of FIG. 1, confinement region 120 is shown to include alternating layers 122 and 124 of dielectric materials having different refractive indices. One set of layers, e.g., layers 122, define a high-index set of layers having an index $n_{hi}$ and a thickness $d_{hi}$, and the other set of layers, e.g., layers 124, define a low-index set of layers having an index $n_{ol}$ and a thickness $d_{lo}$, where $n_{hi} > n_{lo}$. For convenience only a few of the dielectric confinement layers are shown in FIG. 1. In practice, confinement region 120 may include many more layers (e.g., twenty or more layers). Waveguide 100 may further include an additional structural cladding layer 140 surrounding the confinement region 120 to provide structural support to the waveguide as a whole. Because structual layer 140 does not contribute substantially to the optical properties (e.g., radiative losses and dispersion) of the waveguide, we do not discuss it further.

To simplify numerical calculations in the sections that follow, we assume a circular cross-section for fiber waveguide 100, with core 110 having a circular cross-section and region 120 (and layers therein) having an annular cross-section. In other embodiments, however, the waveguide and its constituent regions may have different geometric cross-section such as a rectangular or a hexagonal cross-section. Furthermore, as mentioned below, core and confinement regions 110 and 120 may comprise multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 110 and 120, however, is defined by a change in index. The change may be caused by the interface of two different dielectric materials or by different dopant concentrations in the same dielectric material (e.g., different dopant concentrations in silica).

Dielectric confinement region 120 guides EM radiation in a first range of frequencies to propagate in dielectric core 110 along the waveguide axis. The confinement mechanism is based on a photonic crystal structure in region 120 that forms a bandgap including the first range of frequencies. Because the confinement mechanism is not index-guiding, it is not necessary for the core to have a higher index than that of the portion of the confinement region immediately adjacent the core. To the contrary, core 110 may have a lower average index than that of confinement region 120. For example, core 110 may be air or vacuum. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 110 may include a porous dielectric material to provide some structural support for the surrounding confinement region while still defining a core that is largely air. Accordingly, core 110 need not have a uniform index profile.

The alternating layers 122 and 124 of confinement region 120 form what is known as a Bragg fiber. The alternating layers are analogous to the alternating layers of a planar dielectric stack reflector (which is also known as a Bragg mirror). The annular layers of confinement region 120 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of frequencies in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for frequencies both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the annular layers in confinement region 220 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega = c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

When alternating layers 122 and 124 in confinement region 120 give rise to an omnidirectional bandgap with respect to core 110, the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflectivity in a planar geometry of at least 95% for all angles of incidence ranging from 0° to 80° and for all polarizations of EM radiation having frequency in the omnidirectional bandgap. Furthermore, even when waveguide 100 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index contrast of the two layers) and the lowest-index constituent of the photonic crystal.

In additional embodiments, the dielectric confinement region may include photonic crystal structures different from a multilayer Bragg configuration. For example, rather than the Bragg configuration, which is an example of a one-dimensionally periodic photonic crystal (in the planar limit), the confinement region may be selected to form, for example, a two-dimensionally periodic photonic crystal (in the planar limit), such as an index modulation corresponding to a honeycomb structure. See, for example, R. F. Cregan et al. *Science* 285:1537–1539, 1999. Furthermore, even in a Bragg-like configuration, the high-index layers may vary in index and thickness, and/or the low-index layers may vary in index and thickness. In general, the confinement region may be based on any index modulation that creates a photonic bandgap.

The multilayer waveguides may be fabricated using multilayer co-drawing techniques, co-extrusion techniques, or deposition techniques. Suitable high-index materials may include chalcogenide glasses such as binary and ternary glass systems, heavy metal oxide glasses, amorphous alloys, and high-index doped polymers. Suitable low-index materials may include oxide glasses such as borosilicate glasses, halide glasses, and polymers such as polystyrene. In addition, low-index regions may be fabricated by using hollow structural support materials, such as silica spheres or hollow fibers, to separate high-index layers or regions.

In general, computational methods known in the art can be used to determine the modal properties of the dielectric waveguides described herein. Furthermore, iterative calculations may be used to determine waveguide specifications that optimize selected waveguide properties. We outline below some of the basic physics that underlie such calculations. In particular, the EM modes supported by a structure can be solved numerically according to Maxwell's equations and the boundary conditions for the structure. Furthermore, for an all-dielectric, isotropic structure, Maxwell's equations can be reduced to:

$$\nabla \times \left( \frac{1}{\varepsilon(r)} \nabla \times H(r) \right) = \left( \frac{\omega^2}{c^2} \right) H(r) \tag{1}$$

$$\nabla \cdot H(r) = \nabla \cdot E(r) = 0 \tag{2}$$

$$E(r) = \left( \frac{-ic}{\omega \varepsilon(r)} \right) \nabla \times H(r), \tag{3}$$

where H and E are the macroscopic magnetic and electric fields, respectively, and $\varepsilon$ is the scalar dielectric constant for the structure. To solve for the EM modes of such a structure, one solves the eigenvalue equation given by Eq. 1 (where H is the eigenfunction and $\omega^2/C^2$ is the eigenvalue) subject to the divergence equation, Eq. 2, to give H. Thereafter, one can determine E from H according to Eq. 3.

Often symmetry can be used to simplify the solution. For example, with respect to many of the particular example described herein, we may assume continuous translational symmetry (i.e., a uniform cross-section) along its longitudinal axis, which we shall denote as the z-axis. Of course, in practice the structures may have small deviations from such uniformity. Moreover, the structures will have a finite spatial extent. Nonetheless, based on the assumption of a uniform cross-section for some length that is large relative to the waveguide diameter, the EM modes supported by the waveguides can be written schematically as F(x,y,z)=exp[i($\beta$z−$\omega$t)]F(x,y), where F is any of the electromagnetic field components. The parameter $\beta$ in the expression for F is the longitudinal wavevector.

Hollow Dielectric vs. Metallic Waveguides

Figure 2:
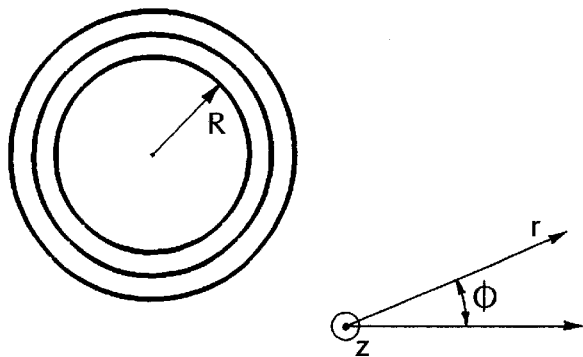
FIG. 2 are schematic diagrams of the cross-sections of a Bragg fiber waveguide (left panel) and a hollow metallic waveguide (right panel).
Figure 2:
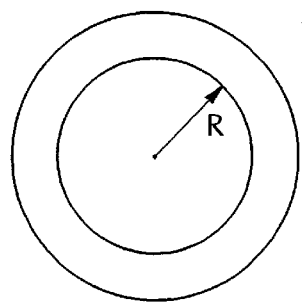

Insight into the principles of dielectric waveguide 100 may be achieved through analogy with a hollow metallic waveguides. FIG. 2 shows a hollow dielectric photonic crystal waveguide 200 having core radius R (left panel) contrasted with a hollow metallic waveguide 210 having a core radius R (right panel). In dielectric waveguide 200, the hollow core (index of refraction unity) is surrounded by a multilayer confinement region (hereinafter "cladding") that includes of alternating layers having high (dark) and low (light) indices of refraction. In the presently described embodiment, the indices of refraction of the cladding layers are selected to be 4.6 and 1.6 and have thicknesses of 0.33 a and 0.67 a, respectively, where a is the thickness of one high/low bilayer. Once a mode frequency v is computed units of c/a, where c is the speed of light, the physical value of a is determined via a=$\lambda$/v for some desired operational wavelength $\lambda$. The radius R of the waveguide will vary in the differing examples presented herein, for example, from a minimum of 2 a to a maximum of 100 a. As we shall see, values of R greater than about 5 a (or even greater than 10 a or 20 a) have many advantages.

Figure 3:
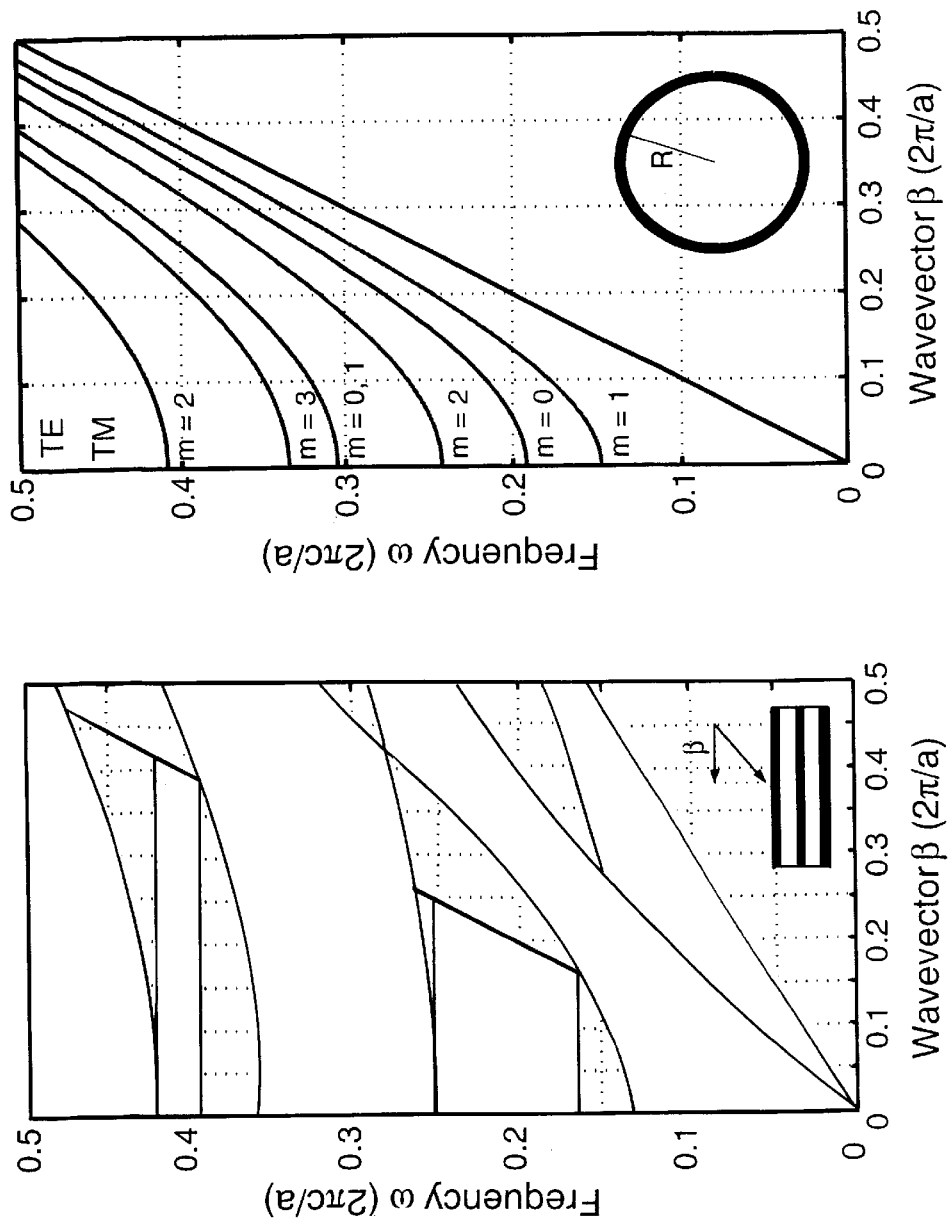
FIG. 3 are photonic band diagrams for a planar Bragg mirror (left panel) and a hollow metallic waveguide (right panel).

Metallic waveguide 210 has as that of hollow dielectric waveguide 200, but a metal cylinder replaces the multilayer dielectric cladding. In the metallic case, light is confined in the core by the impenetrability of a near-perfect metal (something that is practical nonexistent at optical frequencies). The confined modes for metallic waveguide 210 with R=2 a are depicted in FIG. 3 (right panel) for the lowest seven modes. The dispersion relations shown in FIG. 3 depict two conserved quantities: the axial wavenumber $\beta$ and the frequency $\omega$. By symmetry, modes of a cylindrical waveguide can also be labeled by their "angular momentum" integer m. For waveguides that lie along the z axis, the (z,t,$\phi$) dependence of the modes is then given by: exp[i($\beta$z−$\omega$t+m$\phi$)], where $\phi$ is the azimuth coordinate for the cylinder. In the hollow metal tube, the eigenmodes are purely polarized as TM ($H_z$=0) or TE ($E_z$=0), and the l-the mode of a given m is labeled $TX_{lm}$.

In the dielectric case, light is confined by the one-dimensional photonic band gap of the multi-layer cladding, which is easy to analyze in the limit as the cladding becomes planar. The resulting band structure is shown in the left panel of FIG. 3. The dark regions in the left panel of FIG. 3 correspond to ($\beta$,$\omega$) pairs for which light can propagate in the within the mirror, whereas the white and gray regions correspond to situations where light cannot propagate in the mirror. The thick black line in the left panel of FIG. 3 corresponds to the light line ($\omega=c\beta$) and the gray regions correspond to frequency regions of omnidirectional reflectivity for the mirror. For the planar dielectric mirror, $\beta$ is the surface-parallel wavevector component. In the photonic gap regions (the white and gray regions), we expect the mirrors to behave similarly to a metal, and confine modes strongly. Because every eigenmode has a finite, conserved m, the effective wavevector $k_\phi=m/r$ in the $\phi$ direction goes to zero as r becomes large. If this were not true, there could be no band gaps in FIG. 3 because non-zero $k_\phi \perp \beta$ would have to be projected on the Bragg band diagram. Notably, the Bragg band diagram shows ranges of omnidirectional reflection (gray regions), which correspond to frequencies at which any incident wave from air are reflected by the planar mirrors (and vice versa). Omnidirectional reflection per se is not strictly necessary for guidance in these fibers, but its presence is strongly correlated with the regimes of large, polarization-independent gaps along the light line.

Bragg mirrors have different band-gaps for "TE" and "TM" polarizations, referring to fields purely parallel to the interface and fields with a normal component, respectively. (Both polarizations are shown in FIG. 3. Strictly speaking, this corresponds to the metallic waveguide TE and TM labels only for m=0; all non-zero m modes have some nonzero $E_r$ component.

The modes supported by any cylindrical waveguide, including metallic waveguides, Bragg fibers, and conventional index-guided fibers, can be computed by a transfer-matrix method in which the longitudinal fields ($E\{z\}$ and $H\{z\}$) of a given (m, $\omega$, $\beta$) in an annular region of index $n_j$ are expanded in Bessel functions $J_m(k_j r)$ and $Y_m(k_j r)$, with $k_j \equiv \sqrt{n_j^2 \omega^2/c^2 - \beta^2}$. At each interface, the coefficients are related by a 4×4 transfer matrix that matches boundary conditions. The product of all these transfer matrices yields a single matrix relating the fields in the core to those in the outermost cladding. Then, by application of appropriate boundary conditions, the $\beta_n$ wavevectors of the various modes can be founds as discussed further below.

For the moment, we are primarily interested in the modes that lie within the band gap of the one-dimensional Bragg mirrors. Such modes must decay exponentially with r in the cladding (i.e., confinement region), and therefore are truly guided modes in the limit of infinitely many cladding layers (the case of finite layers is considered further below). Most of these modes lie above the $\omega=c\beta$ light line, and thus propagate within the hollow core in much the same way as the modes of a metallic waveguide. It is also possible, however, for modes to lie beneath the light line and yet inside the band gap, in which case they are surface states localized around the core/cladding interface.

Figure 4:
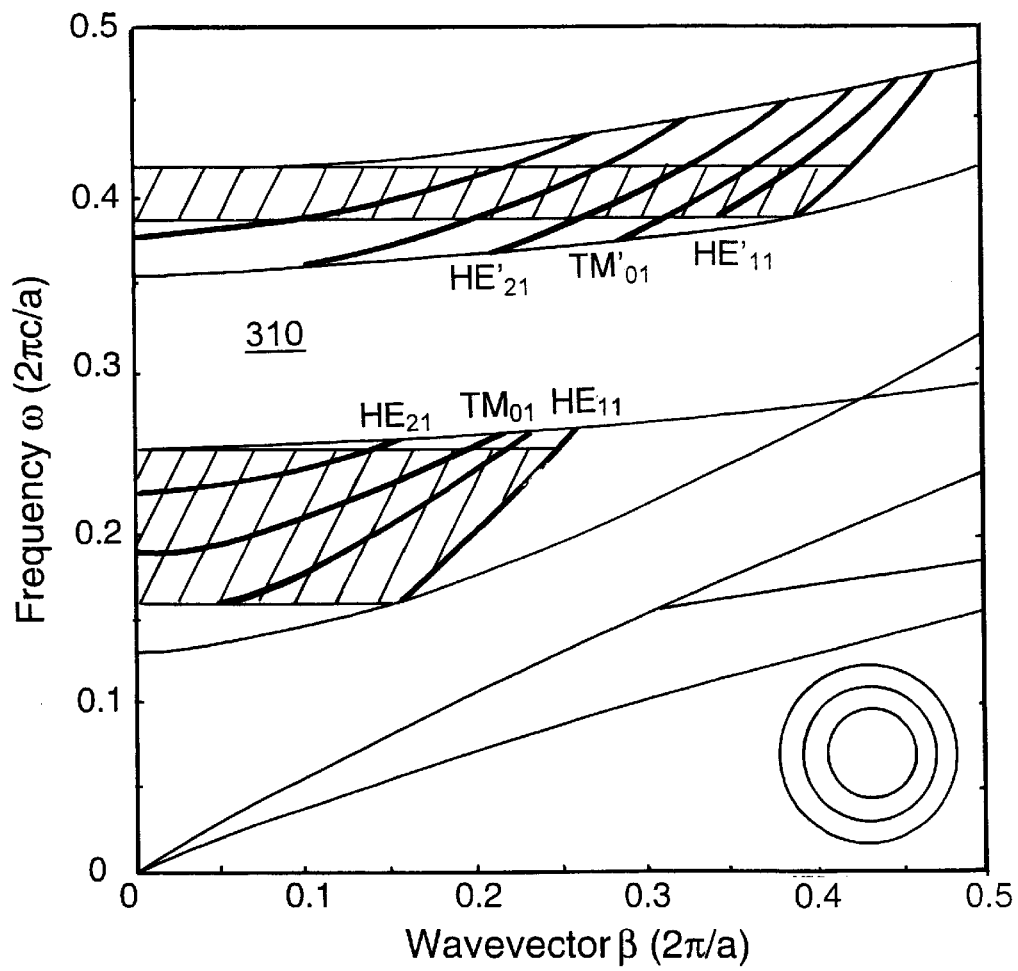
FIG. 4 is a photonic band diagram graph of a Bragg fiber.

In FIG. 4, we show the first couple guided modes computed for a Bragg fiber with core-radius R=2 a and the above-mentioned planar-mirror parameters. The light-colored lines in FIG. 4 are for TE and HE modes, while the dark-colored lines are for TM and EH modes, and again the thick black line is the light line ($\omega=c\beta$). The dark solid regions in FIG. 4 represent the continuum of modes that propagate within the multilayer cladding. The guided modes are at nearly the same frequencies as those for the guided modes of the metallic waveguide in FIG. 3 (right-panel), with the one-dimensional bandgaps superimposed. In the dielectric waveguide, the modes are only purely TE and TM for m=0, but for non-zero m they are strongly TE-like or TM-like, and are called HE and EH, respectively. Furthermore, when a mode enters the second gap, we add a prime superscript. We also find that the guided modes in the Bragg fiber have the same orthogonality relationships as those of the metallic waveguide and conclude that their respective field patterns must also be nearly identical.

Large Core Bragg Fibers

The above calculations yielded the modes of a Bragg fiber for a radius R=2 a. This small radius has the advantage of supporting only a few modes, which are easy to plot and understand in their entirety and even has a single-mode frequency range. The analogy with metallic waveguides, however, indicates that this may not be the most desirable regime for fiber operation with minimal losses.

In metallic waveguides, the lowest-loss mode is $TE_{01}$, and its ohmic losses decrease as $1/R^3$. Moreover, the differential losses between $TE_{01}$ and other modes create a modal-filtering effect that allows these metallic waveguides to operate in an effectively single-mode fashion. On the other hand, for large core radii (high frequencies), losses become dominated by scattering into other closely-spaced modes, especially into the degenerate $TM_{11}$ mode via bends.

Similar results hold for Bragg fibers: the lowest-loss mode is $TE_{01}$ and many of its losses fall off as $1/R^3$. Like the metallic waveguides, and unlike conventional index-guided optical fibers with their small material contrasts, there is also a strong modal-filtering effect based on the degree of confinement in the core. Also as before, inter-modal scattering worsens with increasing R, providing an upper limit for core diameter.

For example, one embodiment of a Bragg fiber having exemplary properties of long distance transmission of optical signals is a Bragg fiber having a hollow core radius of R=30 a, and a confinement region having 17 layers. The 17 layers start with a high-index layer of index 4.6 and alternate with a low-index layer of index 1.6. The thicknesses of the high-index and low-index layers are 0.22 a and 0.78 a, respectively. The point of lowest $TE_{01}$ dissipation losses (which is discussed further below) then lies at a frequency of $\omega \approx 0.28 \cdot 2\pi c/a$, so if we make this correspond to the standard $\lambda=1.55$ microns of telecommunications, we have a=0.434 microns. Equivalently, R=3.02=8.4$\lambda$. Additional details and properties of such an embodiment are disclosed in commonly owned U.S. patent application Ser. No. 10/057,258, entitled "Low-Loss Photonic Crystal Waveguide Having Large Core Radius," and filed Jan. 25, 2002, the contents of which are incorporated herein by reference. We note that for applications different from long distance transmission (e.g., dispersion compensation) such a large core radius may no longer be preferable.

Figure 5:
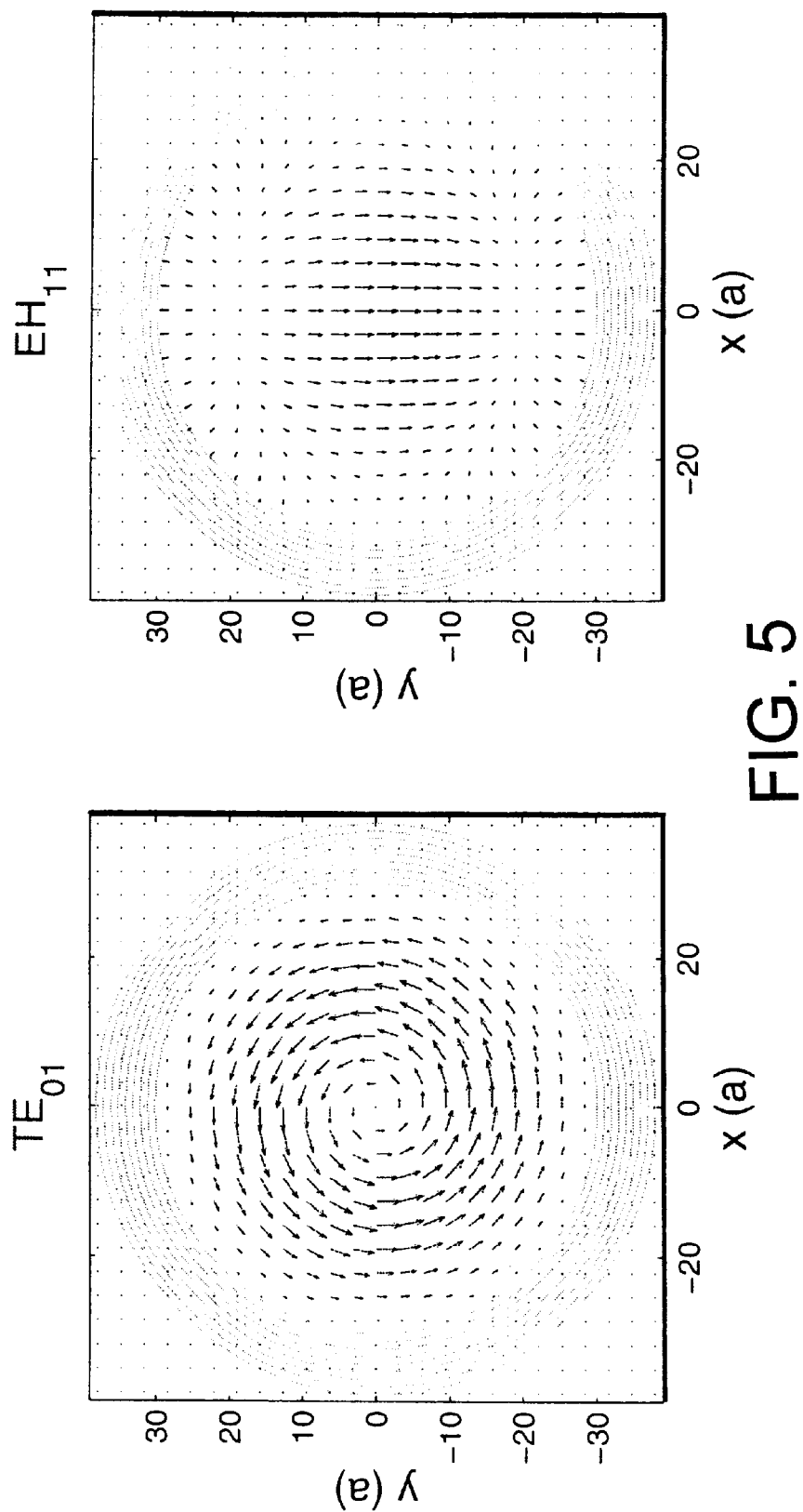
FIG. 5 are plots of the $TE_{01}$ (left panel) and $EH_{11}$ (right panel) field distributions.

As in the R=2 a case above, the guided-modes of a R=30 a Bragg fiber can be labeled by analogy to the modes of an equal-radius metallic waveguide. Tranverse electric field profiles of two such modes in the Bragg fiber, the lowest-loss $TE_{01}$ and the linearly-polarized $EH_{11}$ (analogous mode to the $TM_{11}$ in a metallic guide) are depicted in FIG. 5 for $\omega=0.28(2\pi c/a)$ (which corresponds to $\beta=0.27926(2\pi c/a)$ and $\beta=0.27955(2\pi c/a)$ for the two modes, respectively). The $TE_{01}$ mode is circularly symmetric and "azimuthally" polarized ($\vec{E} \perp \hat{\phi}$). Thus, unlike the doubly-degenerate $EH_{11}$ mode (two orthogonal polarizations), cannot be split into two modes of differing velocities by fiber imperfections, and is therefore immune to polarization-mode dispersion (PMD). We note that the mode labeling in a Bragg fiber is more complex than in a metallic waveguide, because sometimes a mode will cross the light line and become a surface state localized around the core/cladding interface. When that happens, another mode moves "up" and takes its place; for example, the $TM_{01}$ mode crosses the light line at $\omega=0.27$ ($2\pi c/a$), while the $TM_{02}$ mode continuously takes on the core field pattern of $TM_{01}$. When in doubt, we label a mode as HE or EH depending upon whether it is dominated by $H_z$ or $E_z$ at r=0, respectively, and number the core modes according to their ordering above the light line.

Layer Thicknesses

In order to choose the layer thicknesses of the confinement layers, we employ an approximate quarter-wave condition. It is well-known that, for normal incidence, a maximum band gap is obtained for a "quarter-wave" stack in which each layer has equal optical thickness $\lambda/4$, or equivalently $d_{hi}/d_{lo}=n_{lo}/n_{hi}$, where d and n refer to the thickness and index, respectively, of the high-index and low-index layers. Normal incidence, however, corresponds to $\beta=0$, whereas for a cylindrical waveguide the desired modes typically lie near the light line $\omega=c\beta$ (in the limit of large R, the lowest-order modes are essentially plane waves propagating along z-axis, i.e., the waveguide axis). In this case, the quarter-wave condition becomes:

$$\frac{d_{hi}}{d_{lo}} = \frac{\sqrt{n_{lo}^2 - 1}}{\sqrt{n_{hi}^2 - 1}} \quad (4)$$

Strictly speaking, Equation (4) may not be exactly optimal because the quarter-wave condition is modified by the cylindrical geometry, which may require the optical thickness of each layer to vary smoothly with its radial coordinate. Nonetheless, we find that Eq. (4) provides an excellent guideline for optimizing many desirable properties, especially for core radii larger than the mid-gap wavelength.

Scaling Laws with Core Size

Because of the strong reflectivity of the dielectric confinement mirrors, many of the mode properties are determined largely by the geometric size R of the core, within which the modes are confined. Subsequently we derive scaling relations for the different quantities computed, and in this section we lay the groundwork for those derivations by presenting basic scalings of the fields and modes. These scaling relations are largely independent of details such as the precise index contrast that is used, so long as it is sufficiently large for the metallic analogy to hold, and will provide a broad understanding of the advantages and tradeoffs of a Bragg fiber structure.

In particular, we will focus on the suppression of cladding phenomena for the $TE_{01}$ (especially $TE_{01}$) modes of the fiber. A critical property of $TE_{01}$ modes is that, by analogy with a hollow metallic waveguide, they have a node in their electric field near r=R. It then follows that the amplitude of the electric field in the cladding is proportional to the slope of $E_\phi$ at R. The form of $E_\phi$ in the core, however, is simply the Bessel function $J_1(\xi r/R)$, where $\xi(\omega)$ is roughly the 1-th zero of $J_1$. The slope at R is then $(J_0(\xi)-J_2(\xi)(\xi/2R)$. Moreover, for the quarter-wave stack, the value of $E_{100}$ is maximized at near each of the high-index layer to low-index layer interfaces. Thus, not including any normalization of the $J_1$ amplitude (i.e., $E_\phi\sim 1$), we find that the unnormalized $E_\phi$ in the cladding scales as $d_{hi}/R$. In addition typically we must normalize the power of the field: this means dividing the electric field vector E by an additional factor proportional to the square root of the mode area, which is proportional to R, and so:

normalized $TE_{01}$ cladding $$\vec{E} \propto \frac{1}{R^2} \quad (5)$$

Moreover, the area of the field in the cladding is the perimeter (which scales as R) times some constant (penetration depth) that depends on the size of the of the band gap. Combining this with Eq. 5 gives:

fraction of $\int |\vec{E}|^2$ in cladding for $$TE_{01} \propto \frac{1}{R^3} \quad (6)$$

and from this we can derive many other scaling relations. In contrast, for TM or mixed-polarization modes with an $E_r$ component, the unnormalized field amplitude in the cladding remains roughly constant with changing R, thus their fractional energy density in the cladding then scales as only 1/R, so the cladding has a much greater effect on them.

By general phase-space arguments, the total number of modes in the core must scale as the area $R^2$. Moreover, in a metal waveguide, the dispersion relations look like $\beta_n = \sqrt{\omega^2/c^2 - \xi_n^2/R^2}$, where $\xi_n$ are roots or extrema of Bessel functions. Therefore, far from cutoff ($R \gg \xi_n c/\omega$), we have:

mode separation $$\Delta\beta \propto \frac{1}{R^2} \quad (7)$$

Unfortunately, $\Delta\beta$ can be somewhat more complicated in a Bragg fiber, due to the finite field penetration into the cladding and due to the transitions into surface states and subsequent mode relabelings discussed earlier. For example, consider the case of the $EH_{11}$ mode, which is degenerate with $TE_{01}$ in the metallic limit. In the Bragg fiber, however, the degeneracy is broken by the penetration of the fields into the cladding. Such degeneracy breaking can also be understood in terms of the phase shift of a TE/TM polarized wave upon reflection from the dielectric multilayer mirror, which induces a small shift $\Delta\beta$: by perturbation theory, $\Delta\beta$ is proportional to the amount of $EH_{11}$ energy in the cladding, which scales inversely with R:

$TE_{01}$ and $EH_{11}$ mode separation $$\Delta\beta \propto \frac{1}{R} \quad (8)$$

Testing this scaling relation numerically for $\lambda=1.55$ microns, however, we find that this separation eventually scales as $1/R^2$ for R greater than or equal to about 40 a. It turns out that the "fundamental" $HE_{11}$ mode has crossed the light line to become a surface state and $EH_{11}$ continuously transitions to being more $HE_{11}$-like, thus scaling eventually as Eq. 7.

Leaky Modes and Radiation Loss

In the preceding discussion, we have neglected a point that may seem important: in reality, there will be only a finite number of cladding layers in the confinement region. Because of this, and the fact that the modes of interest lie above the light line of the outermost region, the field power will slowly leak out in a process akin to quantum-mechanical "tunneling." This radiation loss, however, decreases exponentially with the number of cladding layers, and we quantify its smallness explicitly below. We find that only a small number of layers is required to achieve leakage rates well below 0.1 dB/km. Moreover, the radiation leakage strongly differs between modes, inducing a modal-filtering effect that allows a large-core Bragg fiber to operate in an effectively single-mode fashion.

In the limit of infinitely many cladding layers, the modes in the core are true confined modes, thanks to the band gap, with discrete real eigenvalues $\beta_n$. For finitely many layers, modes are no longer truly confined (above the outermost light line), leading to a continuum of $\beta$ values with infinitely-extended eigenstates. The former confined modes become leaky resonances: superpositions of real-$\beta$ eigenmodes centered on $\beta_n$ with a width $\Delta\beta$ proportional to the radiative decay rate $\alpha_n$. Such resonances can be studied directly via the physical real-$\beta$ continuum, but a powerful alternative method is the leaky-mode technique, which employs a conceptual analytic continuation from a real $\beta$ to $\beta$ in the complex plane to satisfy a boundary condition of zero incoming flux. The power decay rate $\alpha_n$ is then given by $2\text{Im}\{\beta_n\}$, where Im denotes the imaginary part.

For the Bragg fiber, the leaky-mode method is as follows. The transfer-matrix formulation allows one to compute 2×2 matrices $M_m^\pm(\omega,\beta)$ that connect the TE and TM amplitudes at the origin to the amplitudes of the outgoing (+) or incoming (−) TE and TM cylindrical waves (Hankel functions) in the outermost region, as a function of $\omega$ and $\beta$ for a given angular-momentum index m. For a leaky mode, we wish to impose the boundary condition of zero incoming waves, so that there are no sources at infinity; such a solution exists whenever there is a zero eigenvalue of $M_m^-$. Therefore, we use the determinant:

$$f_m(\omega,\beta) \equiv \det[M_m^-(\omega,\beta)] \tag{9}$$

so that the leaky mode is defined $f_m(\omega,\beta_n)=0$. Once $\beta_n$ is found for a given $\omega$, the corresponding eigenvector of $M_m^-(\omega,\beta_n)$ yields the required mixed-polarization amplitudes. With finitely many layers, the only real roots of $f_m$ lie below the light line of the outermost region. (We note that below the light line of the outermost region, the incoming-wave Hankel function instead becomes an exponentially-growing function, but its coefficient must be zero all the same.) Above this light line, the incoming and outgoing flux are equal for real $\beta$, corresponding to steady-state standing-wave patterns. The small imaginary part of $\beta_n$ above the light line yields the power decay rate $\alpha_n=2\text{Im}\{\beta_n\}$.

Figure 6:
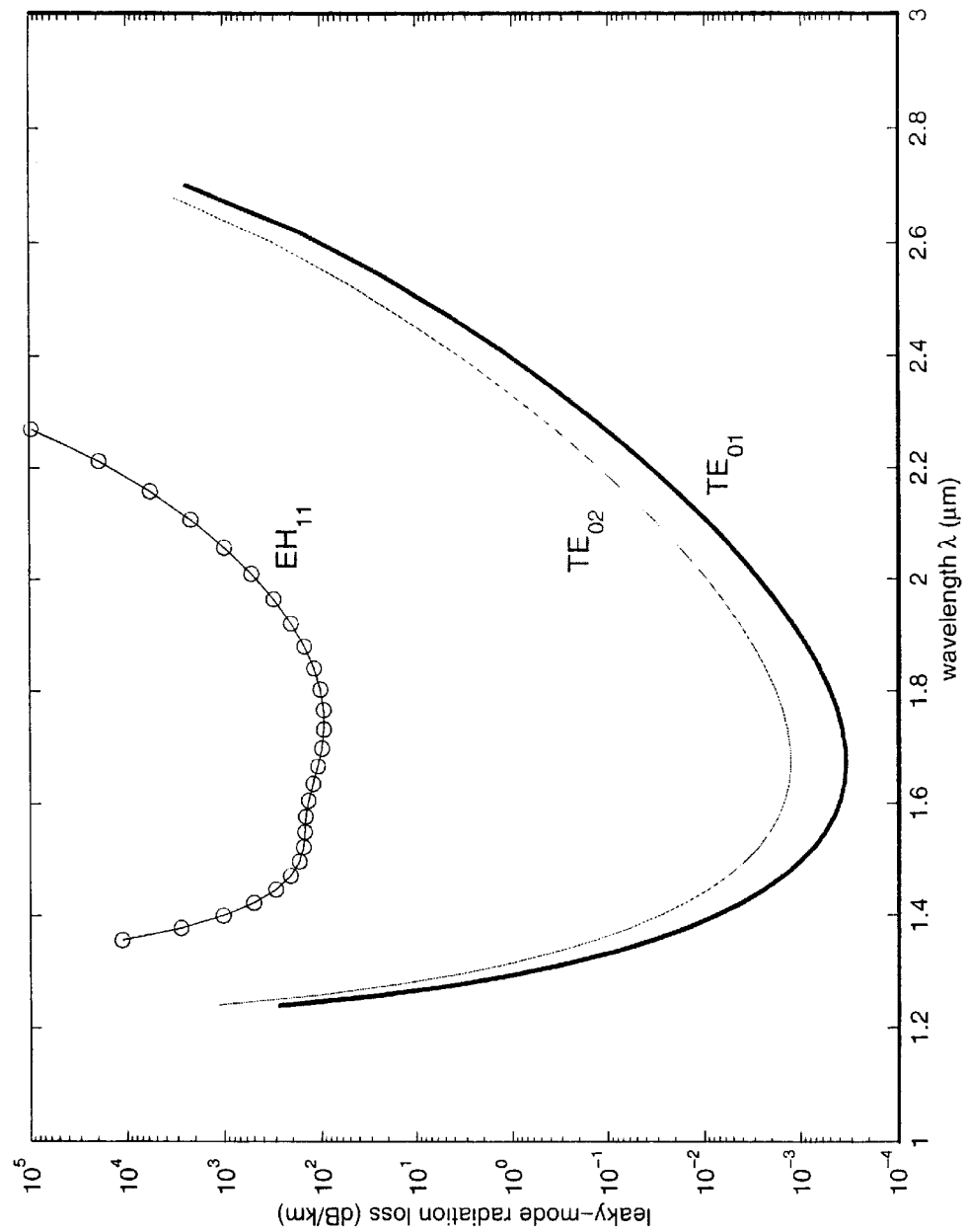
FIG. 6 is a graph of radiation leakage for modes of a large core (R=30 a), 17-layer hollow Bragg fiber.

For all modes, the radiative decay ($\alpha_n$) decreases exponentially with increasing numbers of cladding layers, thanks to the exponential decay of fields in the Bragg band gap, eventually to the point where other losses (e.g. absorption) dominate. At $\lambda=1.55$ microns for this structure, the TE losses decrease by a factor of about 10 per cladding bilayer and the TM losses decrease by a factor of 5 per cladding bilayer. Because of the smaller TM band gap, the losses of mixed-polarization (non-zero m) modes are eventually dominated by their less-confined TM components. In FIG. 6, we display the computed radiation leakage rates $\alpha_n$ for the 17-layer, R=30 a structure parametrized earlier corresponding to the lowest-loss $TE_{01}$ mode, the next-lowest loss $TE_{02}$ mode, and the linearly-polarized $EH_{11}$ mode to typify mixed-polarization modes. Like the absorption discussed later, these differential losses create a mode-filtering effect that allows the $TE_{01}$ mode to operate as effectively single-mode, even for large-core Bragg fibers. From FIG. 6, it is seen that with only 17 cladding layers the $TE_{01}$ mode has leakage rates well under 0.01 dB/km, and even $EH_{11}$ has decay lengths of meters. Thanks to these low losses, the modes can be treated as truly bound for most analyses (e.g. dispersion relations and perturbation theory), with the leakage rates at most included as an independent loss term.

The radiation losses are proportional to the field amplitude $|\vec{E}|^2$ in the cladding, which goes like $1/R^4$ for $TE_{01}$ from Eq. 5, multiplied by the surface area (which scales as R). Thus:

TE$_{01}$ radiation leakage $$a \propto \frac{1}{R^3}, \tag{10}$$

which is the same as the scaling of $TE_{01}$ ohmic losses in a hollow metallic waveguide. In contrast, because of their lack of a node near the boundary, TM and mixed-polarization radiation losses scale only as 1/R.

Index Contrast

The index contrast between the layers of the confinement region manifests itself in the decay rate of the field into the cladding, which determines the characteristic penetration depth $d_p$, and the analogy with the metallic waveguide remains valid when $d_p \ll R$. Below, we derive scaling relations to predict how Bragg fiber properties vary with the cladding indices (assuming $d_p \ll R$).

In particular, with each bilayer of cladding, the fields decrease by some attenuation factor $\kappa(\omega,\beta)$ For modes nearly on the light line, using "quarter-wave" bilayers according to Eq. 4, and defining $\tilde{n}=\sqrt{n^2-1}$, the mid-gap $\kappa$ for TE/TM fields is:

$$\kappa_{te} \cong \frac{\tilde{n}_{lo}}{\tilde{n}_{hi}} \tag{11}$$

$$\kappa_{tm} \cong \frac{n_{lo}^2 \tilde{n}_{lo}}{n_{hi}^2 \tilde{n}_{hi}} > \kappa_{te} \tag{12}$$

The penetration depth $d_p$ is then proportional to $a/(1-\kappa^2)$. Using the earlier scaling law from Eq. 6 and defining $f_{hi} \equiv d_{hi}/a = \tilde{n}_{lo} + \tilde{n}_{hi}$), we can further generalize Eq. 6 to give:

fraction of $\int |\vec{E}^2|$ in cladding for $$TE_{01} \propto \frac{f_{hi}^2}{(1-\kappa_{te}^2)} \frac{a^3}{R^3} \tag{13}$$

The number of cladding layers required to achieve a given radiation leakage rate for TE or TM modes scales inversely with log $(1/\kappa_{te})$ or log $(1/\kappa_{tm})$, respectively. So, for example, if one used indices of 1.459/1.450, as may be common for doped silica layers, about 2000 cladding layers are required to achieve the same TE radiation-leakage rates as in FIG. 6.

The bandwidth also varies with index contrast. One is limited by the size of the TM gap along the light line, which for the quarter-wave stack of Eq. 4 is:

$$\frac{\Delta\omega_{TM}}{\omega_0} = \frac{4}{\pi}\sin^{-1}\left(\frac{n_{hi}^2 \bar{n}_{lo} - n_{lo}^2 \bar{n}_{hi}}{n_{hi}^2 \bar{n}_{lo} + n_{lo}^2 \bar{n}_{hi}}\right) \quad (14)$$

where $\omega_0$ is the mid-gap frequency:

$$\omega_0 = \frac{\bar{n}_{lo} + \bar{n}_{hi}}{4\bar{n}_{lo}\bar{n}_{hi}} \cdot \frac{2\pi c}{a} \quad (15)$$

Dispersion Tailoring

In further embodiments, the photonic crystal waveguide may include a dispersion tailoring region that, like the core region, is surrounded by the confinement region. The dispersion tailoring region introduces at least one additional mode that interacts with one or more of the guided core modes to produce a working mode having a tailored dispersion profile. For example, the dispersion tailoring region may be selected to produce a working mode imparts a small or even zero dispersion at one or more selected wavelengths. Furthermore, for example, the dispersion tailoring region may be selected to produce a working mode that imparts a very large value of dispersion at one or more selected wavelengths, so that the waveguide may be used as a dispersion compensation fiber. Photonic crystal waveguides having such tailored dispersion profiles are described in commonly owned U.S. patent application Ser. No. 10/057,440 entitled "Photonic Crystal Optical Waveguides Having Tailored Dispersion Profiles" and filed Jan. 25, 2002, the contents of which are incorporated herein by reference. We only described them briefly below.

Figure 7:
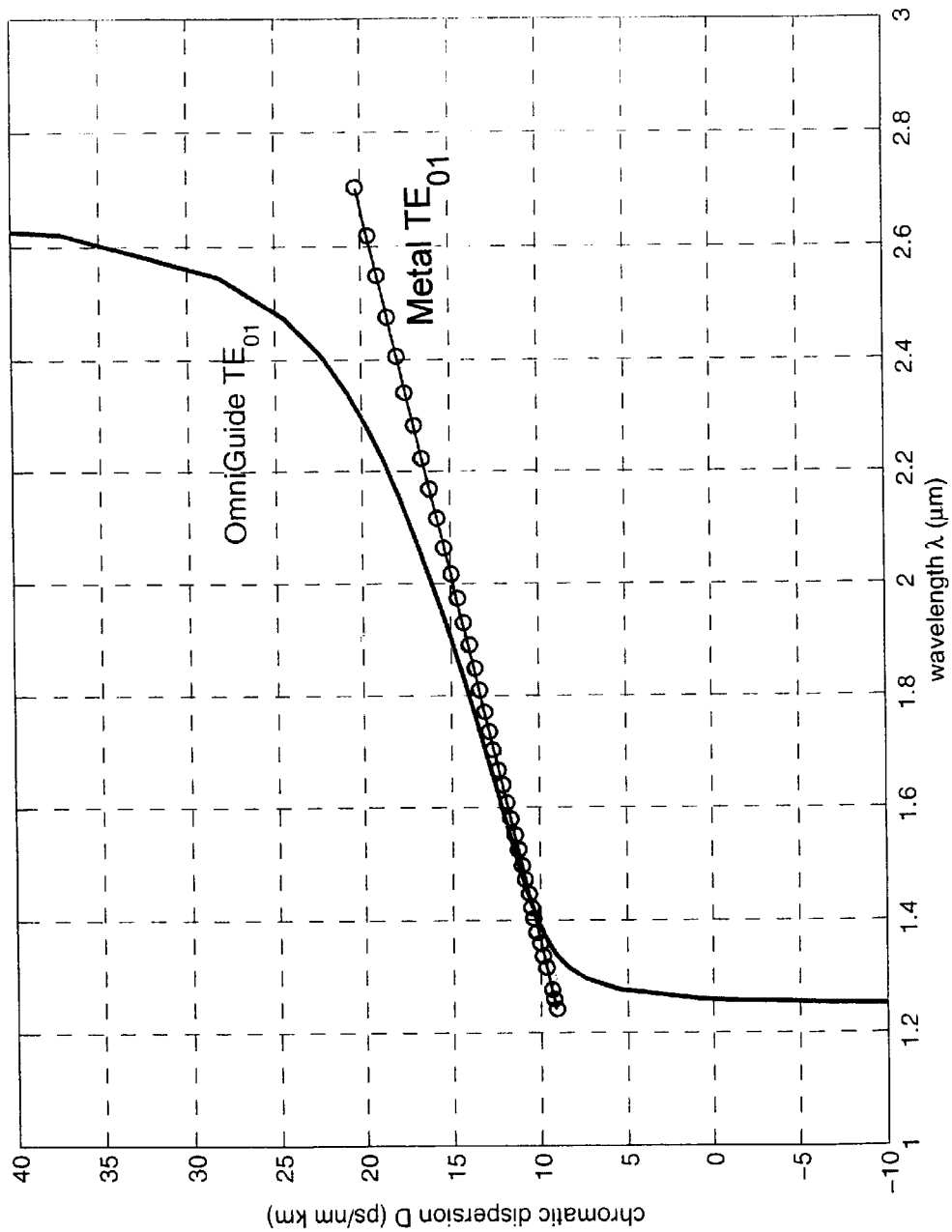
FIG. 7 is a schematic diagram of the cross-section of a Bragg fiber 900 having a dispersion tailoring region.

FIG. 7 shows a cross-section of a photonic crystal fiber 900 including a dielectric core region 910 and a dielectric confinement region 920 including alternating layers 922 and 924 of dielectric materials having different refractive indices. Fiber 900 is identical to fiber 100 except that the thickness of one or more of the first few layers 928 adjacent core 910 are altered to define a dispersion tailoring region 930 and that we have omitted the structural cladding layer. As in FIG. 1, for convenience FIG. 7 shows only the first couple layers of confinement region 920.

By changing the thicknesses of these layers 928, the guided modes in the core (e.g., the $TE_{01}$ mode) penetrate more deeply into the alternating layers over a subset of the guided wavelengths. The particular range of this subset depends on the thickness variations of layers 928, which can be selected to position the subset within the bandgap. The increased penetration causes a local decrease in the group velocity of a guided mode to introduce some extra negative dispersion relative to that in waveguide 100. As a result, the dispersion of a working mode derived from the guided mode in waveguide 900 can be made to be zero near the wavelengths corresponding to increased penetration into the dispersion tailoring region.

Alternatively, the thickness of layers 928 may be adjusted to produce a working mode having very large absolute values of dispersion over a subset of the guided wavelengths. In this case, large dispersion is caused by the interaction between a mode substantially confined to the core and a substantially localized mode introduced by the dispersion tailoring region, whose average index is significantly greater than that of the core. The interaction produces the working mode having the tailored dispersion properties. As the wavelength changes, the character of the working mode changes from one substantially confined to the core to one that extends into the dispersion tailoring region.

Qualitatively, the change in thicknesses of layers 928 (which corresponds, in this example, to the introduction of disperison tailoring region 930) produces a defect in the photonic crystal structure of confinement region 920 and introduces a defect mode localized in the region of the defect 928 to enter the bandgap. The defect mode interacts with at least one guided mode in the core (e.g., the $TE_{01}$ mode) to change its dispersion relation $\omega(\beta)$ and define a working mode with a tailored dispersion profile.

In additional embodiments, the dispersion tailoring region may be formed by a variation in thickness to one or more of the layers that are many layers removed from the core. In other words, the "defect" that produces the dispersion tailoring region may be in the middle of what was the confinement region. In such a case, we refer to the dispersion tailoring region as including all of the layers from the core through to and including the layer(s) that introduce the defect. The remaining layers surrounding the defect form the confinement region and define the bandgap for the dielectric regions therein. Furthermore, in additional embodiments, the dispersion tailoring region may be formed by changing the index of one or more of the layers, instead of, or in addition to, changing the thickness of one or more of the layers. In yet further embodiments, the dispersion tailoring region may have a more complex geometry than one or more layers surrounding the waveguide axis. For example, where the confinement region involves a photonic crystal structure having a two-dimensional index modulation (e.g., a honeycomb structure), the dispersion tailoring region may be a dielectric region that introduces a defect in that index modulation.

Theoretical Techniques for Analyzing Bend(s) in the Waveguide Axis

To analyze bended and spiralled waveguides we employ analysis similar to time-dependent perturbation theory from quantum mechanics with time replaced by the axial distance, z. The modes of the waveguide are described by a frequency $\omega$ and axial wavevector $\beta$, with the fields of the form $\vec{F}(x, y)e^{i(\beta z - \omega t)}$, where $\vec{F}(x, y)$ is some transverse electric/magnetic field profile and $\omega(\beta)$ gives the dispersion relation for each mode. It is assumed that nonlinear effects are negligible over short distances, so $\omega$ is conserved, and we can restrict our consideration to the modes $|n\rangle$ with wavevector $\beta_n$ at a given $\omega$. Losses are also negligible over the distances considered, so $\omega$ and $\beta$ are real. Note, we use the Dirac notation of abstract states $|n\rangle$ and inner products $\langle m|n\rangle$ to represent the underlying fully vectorial electromagnetic modes. Any field pattern $|\psi\rangle$ at the given $\omega$ can be expanded in these modes of the unperturbed waveguide:

$$|\psi\rangle = \sum_n \alpha_n(z)|n\rangle e^{i\beta_n z}, \quad (16)$$

where $\alpha_n(z)$ are the complex expansion coefficients, and the $e^{i\beta_n z}$ has been explicitly separated from the state $|n\rangle$. In a straight waveguide, the $\alpha_n(z)$ are constants—the states $|n\rangle$ are eigenmodes and do not couple. A bend or other perturbation introduces a coupling between the modes, however, and the amplitudes $\alpha_n$ then satisfy a linear differential equation:

$$\frac{d}{dz}\alpha_n = i\sum_l C_{nl}\alpha_l e^{i\Delta\beta_{ln}z}, \quad (17)$$

and the coupling factors $C_{nl}$ depend on the states $|n\rangle$ and $|l\rangle$ and on the nature of the perturbation (and may be a function of z).

For a bend of curvature R in the x-z plane, the coupling factors $C_{nl}$ can be expressed as:

$$C_{nl} = -\left\langle \begin{matrix} E_x^{(n)} \\ E_y^{(n)} \\ E_z^{(n)} \\ H_x^{(n)} \\ H_y^{(n)} \\ H_z^{(n)} \end{matrix} \right| \frac{\omega x}{cR} \begin{pmatrix} \varepsilon & & & & & \\ & \varepsilon & & & & \\ & & -\varepsilon & & & \\ & & & \mu & & \\ & & & & \mu & \\ & & & & & -\mu \end{pmatrix} \left| \begin{matrix} E_x^{(l)} \\ E_y^{(l)} \\ E_z^{(l)} \\ H_x^{(l)} \\ H_y^{(l)} \\ H_z^{(l)} \end{matrix} \right\rangle \quad (18)$$

where the states are explicitly expressed in terms of their field components, where $\varepsilon$ and $\mu$ are the dielectric and permeability constants, respectively, for the waveguide, and where c is the speed of light. Integration of Eq. (17) gives the mode conversion(s). The bend angle $\theta$ enters the calculation through the boundary condition over which the differential equation in Eq. 18 is integrated.

When the waveguide is circularly symmetric, the modes can be chosen such that the azimuthal dependence of any mode can be expressed as exp(im$\phi$), where m is an integer indexing the "angular momentum." A linear polarization corresponds to a superposition of the degenerate m and −m pairs for modes with non-zero m. Therefore, expressing Eq. (18) in cylindrical coordinates (x=rcos$\phi$) gives:

$$C_{nl} = (r \text{ integral}) \cdot \delta_{\Delta m_{nl},\pm 1}, \quad (19)$$

In other words, when there is cylindrical symmetry, the coupling element is non-zero only for modes whose angular momentum indices differ by one.

In the typical case, one starts with a single mode (say $TE_{01}$ or $EH_{11}$), corresponding to $\alpha_0(0)=1$, with all other states at zero amplitude $\alpha_{n\neq 0}(0)=0$. The fraction of the input power converted into the mode $|n\neq 0\rangle$ after some distance z is then given by $|\alpha_n(z)|^2$. When the pertubation is weak, i.e., when $C_{nl}$ is small, which, for example, is true for large-radius bends, we can integrate Eq. (17) with a first-order perturbation theory. In this case, the conversion efficiency into $|n\neq 0\rangle$ is given approximately (to lowest order in C) by the following expression:

$$|\alpha_n(z)|^2 = \left| C_{0n} \frac{\sin(\Delta\beta_{n0}z/2)}{\Delta\beta_{n0}/2} \right|. \quad (20)$$

Eq. (20) has one feature that the larger the $\Delta\beta$, the weaker the coupling. Thus, for example, because C is proportional to 1/R for a bend of radius R, the coupling is negligible for R$\Delta\beta\gg$1. There is a simple explanation in that $\Delta\beta$ represents a phase mismatch between the modes: destructive interference occurs in the coupling unless the bend is so tight that the modes do not have enough length to interfere. This has several consequences. First, for sufficiently large bend radii the conversion into other modes is negligible, and falls off as $1/R^2$. Second, when solving Eq. (17) numerically (e.g., to account for stronger coupling), it is sufficient to consider only modes with $\beta$ nearby to the initial mode—thus reducing the differential equation to finite dimensions. Third, if one $\Delta\beta$ is smaller than all others, one can convert preferentially into that mode by using a bend radius R of around $2\pi/\Delta\beta$, e.g., within about an order of magnitude.

Furthermore, as described above, for circularly-symmetric waveguides all modes can be labeled by an "angular momentum" integer m that defines their angular dependence, which is then of the form $e^{im\phi}$. (In modes like $TE_{01}$ and $EH_{11}$, the first subscript denotes m, i.e., m=0 and m=1 respectively.) Again, a linear polarization corresponds to a superposition of the degenerate m and −m pairs for modes with non-zero m. As given by Eq. (19), there is a selection rule for waveguide bends (and helices, for that matter) that makes $C_{nl}$=0 (no direct coupling) for any states whose m differs by $\Delta m\neq\pm 1$. One can still couple indirectly to modes that do not obey this selection rule, but such processes are higher-order in C and are thus weaker than direct coupling—therefore, we need only consider a limited range of m when calculating numerical solutions of Eq. (17).

Bend Conversion in Bragg Fibers

As described above, in Bragg fibers with low-index (e.g., hollow) cores the lowest loss mode is the $TE_{01}$ mode, and is therefore preferable for propagation. In particular, even though large core Bragg fibers may support multiple modes, differential attenuation of the other modes relative to the $TE_{01}$ mode makes the waveguide effectively single-mode over long distances. Unfortunately, the azimuthally-symmetric field lines of the $TE_{01}$ mode (i.e., field lines that circle around a node at the center of the fiber) is radically different from the linearly-polarized field patterns of typical laser sources or of the modes of conventional index-guided optical fibers. This makes it difficult to couple directly into (from a laser) or out of (to a fiber) the $TE_{01}$ mode at the ends of the Bragg fiber. Much more suitable for such coupling is the (mostly) linearly-polarized $EH_{11}$ mode. For example, mode matching computations show that 70% or more of a linearly polarized, input Gaussian beam can be coupled into the $EH_{11}$ mode. As indicated above, the field lines for the $TE_{01}$ and $EH_{11}$ modes are shown in FIG. 5.

Based on the theoretical results of the previous section, we see that a single bend especially lends itself to converting energy between the $EH_{11}$ mode (for input/output coupling) and the $TE_{01}$ mode for propagation. In particular, we can take advantage of two facts: first, $|\Delta m|=1$ for these modes, permitting direct coupling; and second, $\Delta\beta$ is smaller for these modes than for any other mode pair. The smallness of $\Delta\beta$ comes from the similarity of the Bragg fiber modes to those of a hollow metallic waveguide, in which the $TE_{01}$ and $EH_{11}$ modes are actually degenerate ($\Delta\beta=0$). $EH_{11}$ is called "$TM_{11}$" in the metallic case, for which the polarizations are not "hybridized." If the modes were degenerate in our case, that would be a problem, because it would mean that any bend would incur significant conversion losses regardless of radius. Because a Bragg fiber is not exactly the same as the metallic waveguide, however, the modes are not exactly degenerate over most of the bandwidth—they are separated by a small $\Delta\beta$ that is nevertheless around twice smaller than for the next-closest mode with ($HE_{12}$). Accordingly, one can convert efficiently between these modes by selecting an appropriate bend radius R and bend angle $\theta$.

In one example, we consider a Bragg fiber designed to guide light around $\lambda$=1.55 $\mu$m in a hollow core of radius 15.35 microns surrounded by 25 layers alternating between a low-index layer ($n_{lo}$=1.5) having a thickness of 0.358 microns and a high-index layer ($n_{lo}$=2.8) having a thickness of 0.153 microns. We consider a 6% bandwidth, and compute a numerical solution of Eq. (17) coupling 45 guided modes (considering only those modes with the smallest $\Delta\beta$ and $|\Delta m|\leq 1$, as described above, and counting m and −m guided modes as a single mode). We note that this 6% bandwidth corresponds to about 90 nm, which covers both the C-band and the L-band of silica optical fibers. In principle, one could also compute non-guided modes, e.g., cladding modes, and backwards-propagating modes, but such modes all have large $\Delta\beta$. For this structure, at a variety of bend radii and angles, we thus find the conversion efficiency from $TE_{01}$ to $EH_{11}$ around a bend, or vice versa (the conversion efficiencies are the same forwards and backwards). Strictly speaking, we compute the conversion to/from the sum of $EH_{11}$ and $EH_{-1,1}$, because it is the degenerate superposition of those modes that corresponds to a linear polarization.

Figure 9:
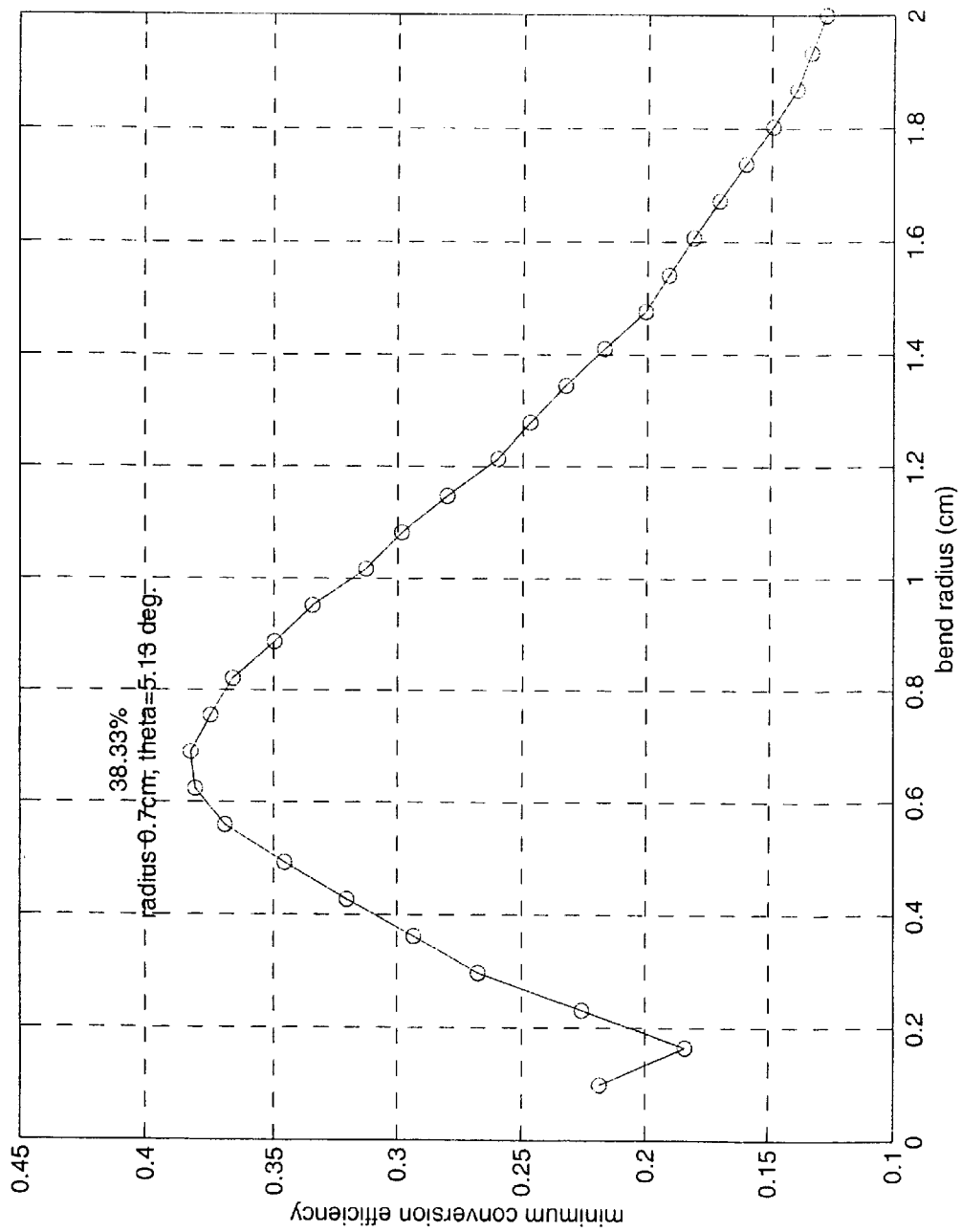
FIG. 9 is a plot of the minimum conversion efficiency between $TE_{01}$ and $EH_{11}$ over a 6% bandwidth in a Bragg fiber as a function of bending radii R for an optimum bend angle $\theta$.
Figure 10:
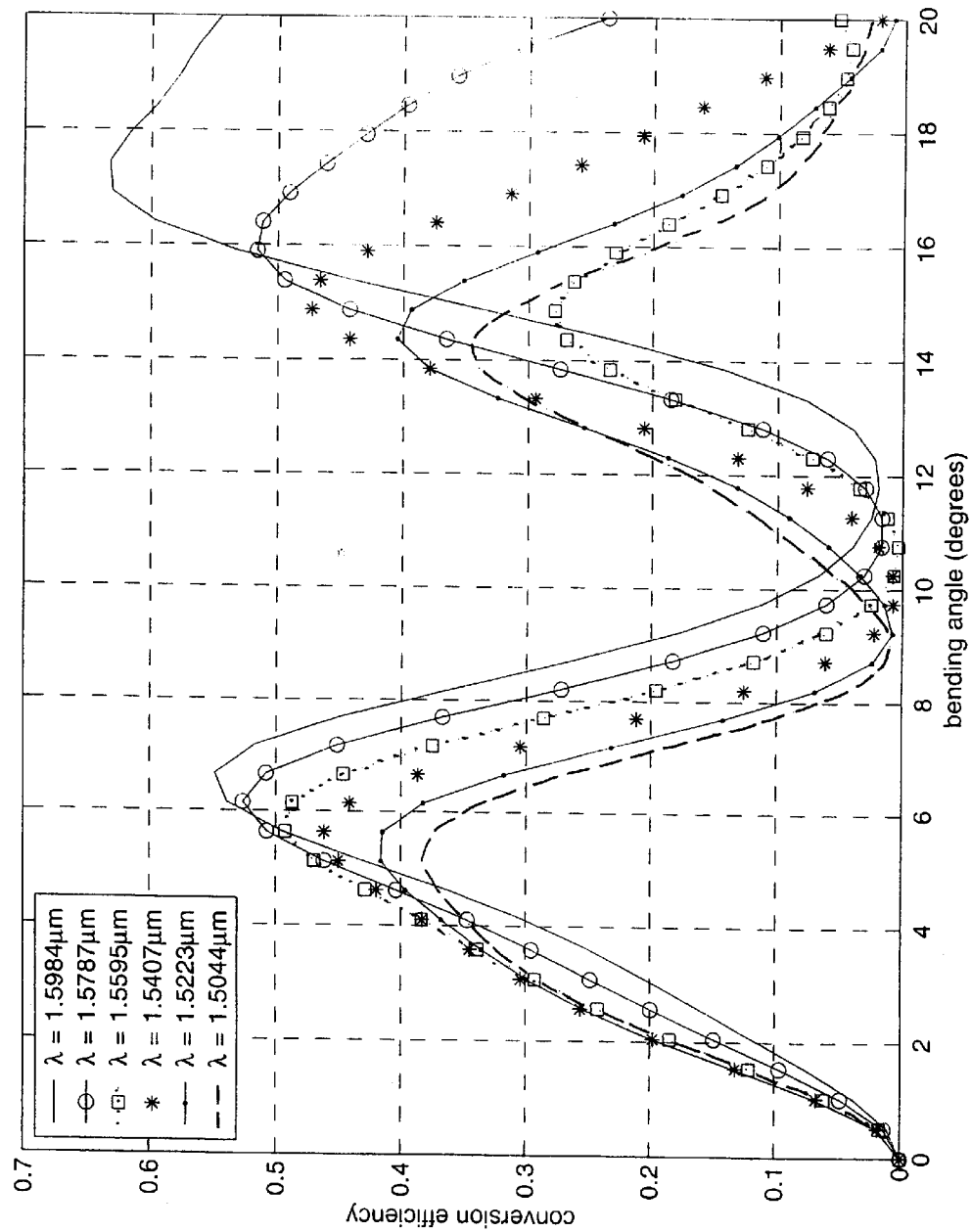
FIG. 10 is a plot of the conversion efficiency between $TE_{01}$ and $EH_{11}$ for wavelengths within a 6% bandwidth in a Bragg fiber as a function of bend angle $\theta$ for an optimum bending radius R.

For each bending radius, we find the bend angle that has the best conversion efficiency over the whole 6% bandwidth, and plot the minimum conversion efficiency over the bandwidth for the best bend angle as a function of radius in FIG. 9. From this plot, we see that an efficiency of almost 40% for the whole bandwidth can be achieved at a radius of about 0.7 cm (which is on the order of $1/\Delta\beta$ as expected). For this optimal bend radius, we plot the efficiency as a function of bend angle for five wavelengths spanning the bandwidth in FIG. 10. We see that the 40% minimum efficiency is achieved at a bend angle of only 5.13°, imposing minimal stress on the fiber, and that considerably higher conversion efficiencies (over 90% depending on the operating wavelength) can be achieved if one is willing to further restrict the bandwidth.

Helical Bends

In the previous example, the modes that we wish to convert happen to be the ones with the smallest $\Delta\beta$, thereby making the single bend mechanism feasible. This situation, fortunately, is applicable to a wide variety of waveguide structures. Nonetheless, there may be cases in which one wishes to convert into a different mode, one for which $\Delta\beta$ for the desired mode pair is not significantly less than that for any other mode pair. Below, we show that a helical bend ("helix") can be used to effectively "tune" $\Delta\beta$ to arbitrarily small for the desired mode pair.

A helix, or upwards spiral, is a circular path that also rises at a constant rate. This curve can be parameterized by the azimuthal angle θ, and its (X,Y,Z) coordinates are then written as $$(X,Y,Z)=(R \cos \theta, R \sin \theta, R\gamma\theta). \quad (21)$$

Here, γ is a dimensionless constant that describes the rise rate; γ=0 corresponds to an ordinary circular bend of radius R, and γ=tan α where α is the rise angle. In terms of light propagation, a helical path has two important properties. First, it has a constant effective (instantaneous) radius of curvature:

$$R_c = R\sqrt{1+\gamma^2}; \quad (22)$$

this determines the strength of the bend coupling. Second, there is a twist angle:

$$\Delta\varphi = -\frac{\gamma}{R_c}z. \quad (23)$$

where z is the arc length along the curve. In other words, the coordinate system of the waveguide rotates at a constant rate, and this is the only difference between a helix and a circular bend of radius $R_c$ for optical propagation. In the case of circularly-symmetric waveguides, such as a typical Bragg fiber, the twist angle has a particularly simple effect, because the angular dependence of the modes is just $e^{im\Phi}$. Thus, in the coupling coefficient $C_{nl}$, the twist angle results only in a factor of the form e l[−y/$R_c\Delta$m]: By inspection of Eq. (17), this term can be combined with into $\Delta\beta$ to produce an effective $\Delta\beta'=\Delta\beta+\delta\beta$, where:

$$\delta\beta = -\frac{\gamma}{R_c}\Delta m \quad (24)$$

is the shift in $\Delta\beta$. This effective $\Delta\beta'$ is used in place of $\Delta\beta$ to compute mode coupling, e.g., in Eq. (20).

Thus, by choosing an appropriate helical rise rate γ, one can shift $\Delta\beta$ so that any desired mode can have the smallest effective $\Delta\beta'$, and thus can be efficiently converted to with a helical bend. Another consequence is that a helical bend could potentially further improve the conversion efficiencies between $TE_{01}$ and $EH_{11}$ beyond the 40% achieved in the previous example by a single bend. For example, this could be done by increasing the $\Delta\beta$ contrast compared to other modes. We note, however, that because $\Delta\beta$ depends on the sign of $\Delta m$, only one of the $EH_{11}$ or $EH_{-1,1}$ modes will be excited, rather than their sum as for the circular bend, resulting in circularly-polarized (rotating polarization) light at the output.

Serpentine Bends

Another possible way to select particular modes for conversion is to use a "serpentine" bend: this is a bend that wiggles back and forth within a plane in a periodic fashion. This mechanism is easily understood as follows. In this case, the coupling matrix element C is proportional to 1/R, where R is the instantaneous radius of curvature. We make this vary sinusoidally along the waveguide:

$$\frac{1}{R} = \frac{\sin(2\pi z/\Lambda)}{R_0}, \quad (25)$$

where $R_0$ is the maximum radius of curvature and Λ is the period (or "pitch") of the perturbation. Here, a negative radius of curvature simply means a bend in the opposite direction, and 1/R=0 denotes a straight waveguide (or in this case, an inflection point). Now, one can simply absorb the sin function into the $\Delta\beta$ exponent of Eq. (17) as a shift:

$$\delta\beta = \pm\frac{2\pi}{\Lambda}, \quad (26)$$

where terms of both signs are present in the coupling. Besides this β shift, the result is the same as an ordinary bend of radius $R_0$. Thus, by an appropriate choice of pitch Λ, we can again force the $\Delta\beta$ of a desired mode pair to be zero or near-zero, and design a bend to efficiently couple to the desired mode pair. For the typical case of $R_0$>>Λ (or even for $R_0=\Lambda$), the curve of Eq. (25) is approximately just a sinusoid of period $\Lambda$ and amplitude $\Lambda^2/4\pi^2 R_0$.

Unlike the helical bend, we have made no assumption here of circular symmetry in this analysis. In a circularly symmetric waveguide, there is the $|\Delta m|=1$ selection rule as usual. Because $\Delta\beta$ does not depend on the sign of $\Delta m$ the result for m=0 will be a linear combination of ±m modes. Thus, as in the single bend, one can convert from an m=0 to the superposition two degenerate m=1 and m=−1 modes, which will correspond to a linear polarization. As a result, the serpentine bend may be more attractive than a helix if one wishes to enhance the conversion efficiency between $TE_{01}$ and (linearly polarized) $EH_{11}$. More generally, the mode coupling segment may include any combination of bends, helices, and serpentine bends to achieve greater control over $\Delta\beta$.

Telecommunication Systems

Figure 11:
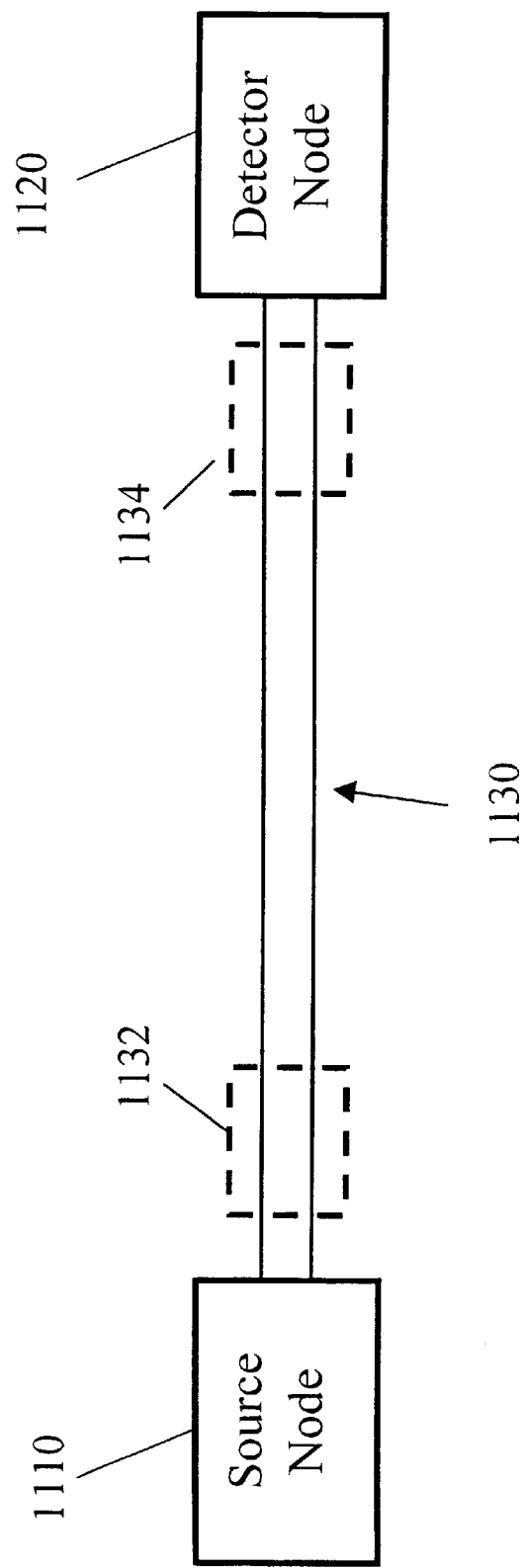
FIG. 11 is a schematic diagram of an optical telecommunication system that implements the photonic crystal waveguides having the mode coupling segment described herein.

The photonic crystal waveguides described herein having the mode coupling segment may be used in optical telecommunications systems. FIG. 11 shows a schematic diagram of an optical telecommunication system 1100 including a source node 1110 and a detection node 1120, which are coupled to one another by an optical waveguide 1130 such as the photonic crystal waveguides described herein. Waveguide 1130 includes a first mode coupling segment 1132 adjacent source node 1110 for converting EM energy from a waveguide mode used to improve coupling efficiency from source node 1110 (e.g., linearly polarized $EH_{11}$) to another waveguide mode, such as one suitable for long distance transmission or dispersion compensation (e.g., the $TE_{01}$ mode). Waveguide 1130 also includes a second mode coupling segment 1134 adjacent detector node 1120 for converting EM energy from the waveguide mode used to propagate along waveguide 1130 from the first mode coupling segment to another mode used to improve coupling efficiency to detector node 1120 (e.g., linearly polarized $EH_{11}$). Each mode coupling regions may include any of a bend, multiple bends, a helix, a serpentine bend, or some combination thereof.

Source node 1110 may be the original source of an optical signal directed along the waveguide or it may be an intermediate node that redirects the optical signal to waveguide 1130, optically amplifies it, and/or electronically detects it and optically regenerates it. Furthermore, source node 1110 may include components for multiplexing or demultiplexing multiple optical signals at different wavelengths. Moreover, source node 1110 may be another waveguide (e.g., a conventional index-guided fiber) different from waveguide 11130. Similarly, detector node 1120 may be the final destination for the optical signal transmitted along the waveguide, or it may be an intermediate node that redirects, optically amplifies, and/or electrically detects and optically regenerates the optical signal. In addition, detector node 1120 may also include components for multiplexing or demultiplexing multiple optical signals at different wavelengths. Moreover, detector node 1120 may be another waveguide (e.g., a conventional index-guided fiber) different from waveguide 1130. Furthermore, the optical signal transmitted along the waveguide may be a WDM signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

Notably, when a mode coupling segment is used, the polarization of the light going into, or out of, the waveguide can be specified. In particular, for both the single bend and the serpentine bend, when $TE_{01}$ (or any m=0 TE mode) is input, the output (e.g., $EH_{11}$) will be linearly-polarized perpendicular to the plane of the bend(s). Similarly, when an m=0 TM mode is input, the output is linearly-polarized parallel to the plane of the bend(s). This means that a polarization-sensitive device can freely be used at the output, since the polarization is known. Conversely, when converting to TE/TM m=0 modes, the input is, polarized perpendicular/parallel, respectively, to the plane of the bend. In other words, the mode coupling segments are polarization specific. Accordingly, a component coupled to the photonic crystal fiber adjacent the mode coupling segment may be aligned to minimize any loss associated with a polarization mismatch. In contrast, PMD in conventional index-guided fibers can randomize polarization (e.g., random linear, circular, or elliptical polarization) making such alignment difficult, or even impossible without some active correction of the randomized polarization.

Furthermore, the helical bend described above can convert m=0 modes to/from a particular circularly polarized mode. For example, it can convert clockwise-circular polarization into $TE_{01}$ and leave counterclockwise-circular light untouched. In addition, because a single circular polarization is equally composed of the two linear polarizations and vice versa, any arbitrary linear polarization will be 50% clockwise-circular—and this portion of the input will be converted into $TE_{01}$ by the helix. Thus, even a source such as a fiber with an unknown linear polarization can be converted into the desired $TE_{01}$ mode, albeit with an additional 50% power penalty. However, there will be a circular input polarization for which there is zero coupling.

A number of embodiments of the invention have been described. Nevertheless, it will be understood that various modifications may be made without departing from the spirit and scope of the invention.

For example, in additional embodiments, one may want to vary the bandgap properties prior to, or after, the mode coupling segment, by tapering the waveguide to scale the dimensions of its cross-sectional index profile. Also, in further embodiments having a helical/serpentine bend, the rise rate/pitch of the respective bend may vary along the waveguide axis to produce a "chirped" periodicity. More generally, for example, the mode coupling segment may include a region having a varying (e.g., continuously) varying radius of curvature. When the varying radius of curvature lies within a common plane and involves oscillations in the sign of the radius of curvature, the mode coupling segment may be considered to comprise a serpentine bend. Furthermore, during operation, one may actively tune the bend parameters of a mode coupling segment to optimize coupling efficiency. Finally, the mode conversion techniques described herein are not limited to fiber photonic crystal waveguides, but may also be implement with other types of photonic crystal waveguides, such as those incorporated into an integrated optical circuit (IOCs) that involve photonic crystal confinement along at least one dimension.

Accordingly, other embodiments are within the scope of the following claims.

What is claimed is:

1. A method for converting electromagnetic (EM) energy between guided modes of a photonic crystal waveguide having a waveguide axis, the method comprising:

providing the photonic crystal waveguide with a mode coupling segment comprising at least one bend in the waveguide axis, wherein during operation the mode coupling segment converts EM energy in a first guided mode to a second guided mode over a first range of frequencies;

providing EM energy in the first range of frequencies in the first guided mode of the photonic crystal waveguide; and allowing the EM energy in the first guided mode to encounter the mode coupling segment to convert at least some of the EM energy in the first guided mode to EM energy in the second guided mode.

2. The method of claim 1, wherein the mode coupling segment comprises a serpentine bend in the waveguide axis, the serpentine bend including the at least one bend.

3. The method of claim 2, wherein the serpentine bend comprises multiple coplanar bends defining a varying radius of curvature for the waveguide axis in the mode coupling segment.

4. The method of claim 3, wherein the varying radius of curvature is oscillatory.

5. The method of claim 4, wherein the varying radius of curvature is periodic.

6. The method of claim 3, wherein the serpentine bend can be expressed as $1/R=\sin(2\pi z/\Lambda)/R_0$, where R is the instantaneous radius of the waveguide axis along the serpentine bend, $R_0$ is the radius of the maximum curvature for the serpentine bend, $\Lambda$ is the pitch of the serpentine bend, and z is the coordinate along the waveguide axis.

7. The method of claim 6, wherein the radius of maximum curvature $R_0$ and the pitch $\Lambda$ of the serpentine bend are selected such that the absolute value of one of the expressions $\Delta\beta_{lm} \pm 2\pi/\Lambda$ for guided modes l and m is smaller for the first and second guided modes than that for any other pair of the guided modes for a frequency in the first range of frequencies, where $\Delta\beta_{lm}$ is difference in wavevector between guided modes l and m.

8. The method of claim 1, wherein the photonic crystal waveguide has cylindrical symmetry about the waveguide axis, and wherein the guided modes have an angular dependence that can be expressed as a linear combination of $\exp(im\phi)$ and $\exp(-im\phi)$, where $\phi$ is the angle in cylindrical coordinates and m is an integer and provides an angular momentum index for the guided modes.

9. The method of claim 8, wherein one of the first and second guided modes is a TE mode.

10. The method of claim 9, wherein the other of the first and second guided modes has a substantially linear polarization.

11. The method of claim 10, wherein the other guided mode is a superposition of $EH_{1,m}$ and $EH_{1,-m}$.

12. The method of claim 10, wherein the other guided mode is a superposition of $HE_{1,m}$ and $HE_{1,-m}$.

13. The method of claim 8, wherein the first and second guided modes have angular momentum indices that differ by one.

14. The method of claim 1, wherein the mode coupling segment comprises a helix in the waveguide axis, the helix including the at least one bend.

15. The method of claim 14, wherein the helix can be expressed in Cartesian coordinates as ($R\cos\theta$, $R\sin\theta$, $R\gamma\theta$), where R is the radius of the bend, $\gamma$ gives the rise rate of the helix in dimensionless units, and $\theta$ is the azimuthal coordinate of the helix.

16. The method of claim 15, wherein the radius of the bend R and the rise rate $\gamma$ are selected based on the absolute difference in wavevector $\Delta\beta_{12}$ between the first guided mode and the second guided mode at a frequency in the first frequency range.

17. The method of claim 16, wherein the photonic crystal waveguide has cylindrical symmetry about the waveguide axis, wherein the guided modes have an angular dependence that can be expressed as a linear combination of $\exp(im\phi)$ and $\exp(-im\phi)$, where $\phi$ is the angle in cylindrical coordinates and m is an integer and provides an angular momentum index for the guided modes, and wherein the radius of the bend R and the rise rate $\gamma$ are selected such that the absolute value of the expression $\Delta\beta_{lm} - \Delta m_{lm}(\gamma/R\sqrt{1+\gamma^2})$ for guided modes l and m is smaller for the first and second guided modes than that for any other pair of the guided modes for a frequency in the first range of frequencies, where $\Delta\beta_{lm}$ is difference in wavevector between guided modes l and m and $\Delta m_{lm}$ is the difference in angular momentum index for guided modes l and m.

18. The method of claim 15, wherein the rise rate $\gamma$ is substantially constant.

19. The method of claim 1, wherein the photonic crystal waveguide comprises a dielectric confinement region surrounding the waveguide axis, and a dielectric core region extending along the waveguide axis and surrounded by the confinement region about the waveguide axis, wherein the confinement region comprises a photonic crystal having at least one photonic bandgap and during operation the confinement region guides EM radiation in a first range of frequencies to propagate along the waveguide axis.

20. The method of claim 19, wherein the average refractive index of the core is less than 1.1.

21. The method of claim 19, wherein the photonic crystal waveguide further comprises a dielectric dispersion tailoring region surrounded by the confinement region about the waveguide axis, wherein the presence of the dispersion tailoring region causes a guided core mode to form a working mode that penetrates into the dispersion tailoring region for at lease one subset of frequencies within the first range of frequencies.

22. The method of claim 19, wherein the confinement region comprises at least two dielectric materials having refractive indices that differ by at least 10%.

23. The method of claim 19, wherein the confinement region comprises a plurality of higher index dielectric layers and a plurality of lower index dielectric layers alternating with one another to surround the core about the waveguide axis.

24. The method of claim 1, wherein providing EM energy in the first guided mode comprises coupling EM energy into the photonic crystal waveguide as the first guided mode.

25. The method of claim 24, wherein the photonic crystal waveguide includes a second mode coupling segment comprising at least one bend in the waveguide axis, wherein during operation the second mode coupling segment converts EM energy in the second guided mode to a third guided mode over the first range of frequencies, and wherein the method further comprises allowing the EM energy in the second guided mode to encounter the second mode coupling segment to convert at least some of the EM energy in the second guided mode to EM energy in the third guided mode.

26. The method of claim 25, further comprising coupling at least some of the EM energy in the third guided mode out of the photonic crystal waveguide.

27. The method of claim 25, wherein the first and third guided modes are substantially similar.

28. The method of claim 1, wherein the bend in the mode coupling segment has a radius R and a bend angle $\theta$ sufficient to convert the EM energy in the first guided mode to the EM energy in the second guided mode.

29. The method of claim 28, wherein the radius R of the bend in the mode coupling segment is substantially constant.

30. The method of claim 29, wherein the bend radius R is within an order of magnitude of the absolute value of $2\pi(\Delta\beta_{12})^{-1}$, where $\Delta\beta_{12}$ is the difference in wavevector between the first guided mode and the second guided mode at a frequency in the first frequency range.

31. The method of claim 28, wherein the mode coupling segment comprises only the one bend.

32. The method of claim 1, wherein the photonic crystal waveguide comprises a dielectric core region extending along the waveguide axis, and a first set of at least three dielectric layers surrounding the core about the waveguide axis, the difference in refractive index between successive layers in the first set changing sign with each subsequent layer in the first set, wherein the first set of layers guides EM radiation in the first range of frequencies to propagate along the waveguide axis.

33. The method of claim 32, wherein the photonic crystal waveguide further comprises at least one additional dielectric layer positioned between the core and the first set of layers, wherein the thickness of the additional dielectric layer differs from that of each of any three consecutive layers in the first set of layers by more than 10%.

34. The method of claim 1, further comprising coupling at least some of the EM energy in the second guided mode out of the photonic crystal waveguide into a polarization sensitive device.

35. The method of claim 1, wherein the EM energy provided to the photonic crystal waveguide has a wavelength in the range of about 1.2 microns to 1.7 microns.

36. The method of claim 1, wherein the photonic crystal waveguide is a photonic crystal fiber.

37. The method of claim 36, wherein the photonic crystal fiber is a Bragg fiber.

38. The method of claim 1, further comprising coupling at least some of the EM energy in the second guided mode out of the photonic crystal waveguide.

39. The method of claim 1, wherein the mode coupling segment provides a conversion efficiency of the EM energy in the first guided mode to the EM energy in the second guided mode of greater than 10%.

40. The method of claim 1, wherein the mode coupling segment provides a conversion efficiency of the EM energy in the first guided mode to the EM energy in the second guided mode of greater than 25%.

41. The method of claim 1, wherein the mode coupling segment provides a conversion efficiency of the EM energy in the first guided mode to the EM energy in the second guided mode of greater than 50%.

42. The method of claim 1, wherein the radius R of the bend in the mode coupling segment varies along the waveguide axis.

43. The method of claim 1, wherein the absolute value of the difference in wavevector $\Delta\beta_{12}$ between the first guided mode and the second guided mode of the EM energy at a frequency in the first frequency range is smaller than the absolute value of the difference in wavevector $\Delta\beta_{ln}$ between any other pair of the guided modes at that frequency.

44. The method of claim 1, wherein the photonic crystal waveguide has a uniform cross-section with respect to the waveguide axis.

45. The method of claim 1, wherein the EM energy provided to the photonic crystal waveguide has a wavelength in the range of about 0.7 microns to 0.9 microns.

46. A method for converting electromagnetic (EM) energy between guided modes of a photonic crystal fiber having a waveguide axis, the method comprising:

providing the photonic crystal fiber with a mode coupling segment comprising at least one bend in the waveguide axis, wherein during operation the mode coupling segment converts EM energy in a first guided mode to a second guided mode over a first range of frequencies;

providing EM energy in the first range of frequencies in the first guided mode of the photonic crystal fiber; and allowing the EM energy in the first guided mode to encounter the mode coupling segment to convert at least some of the EM energy in the first guided mode to EM energy in the second guided mode.

47. The method of claim 46, wherein the photonic crystal fiber is a Bragg fiber.

48. The method of claim 46, wherein the mode coupling segment provides a conversion efficiency of the EM energy in the first guided mode to the EM energy in the second guided mode of greater than 10%.

49. The method of claim 48, wherein the mode coupling segment provides a conversion efficiency of the EM energy in the first guided mode to the EM energy in the second guided mode of greater than 25%.

50. The method of claim 49, wherein the mode coupling segment provides a conversion efficiency of the EM energy in the first guided mode to the EM energy in the second guided mode of greater than 50%.

* * * * *

UNITED STATES PATENT AND TRADEMARK OFFICE
CERTIFICATE OF CORRECTION

PATENT NO. : 6,563,981 B2
DATED : May 13, 2003
INVENTOR(S) : Ori Weisberg et al.

It is certified that error appears in the above-identified patent and that said Letters Patent is hereby corrected as shown below:

Title Page,
Item [75], Inventors, place "Joannopolous" with -- Joannopoulos --
Item [57], ABSTRACT,
Line 7, after "EM" delete "."
Item [56], References Cited, U.S. PATENT DOCUMENTS,
"E. Marcatti" reference, replace "Marcatti" with -- Marcatili --
"E. Peral et al.," reference replace "coprogating" with -- copropagating --
"T. Liang et al.," reference replace "dielectrics" with -- dielectric --
"T.M. Monro et al.," reference replace "temproal" with -- temporal --

Column 5,
Line 21, replace "ϕ" with -- φ --
Line 22, replace "ϕ" with -- φ -- in both occurrences
Line 65, replace "ϕ" with -- φ -- in all three occurrences Column 6,
Line 46, replace "lease" with -- least --
Line 48, replace "includes" with -- include --

Column 8,
Line 34, after "20%" replace "." with -- , --
Line 67, replace "$n_{01}$" with -- $n_{10}$ --

Column 11,
Line 66, replace "∈" with -- ε --

Column 12,
Line 2, replace "$C^2$" with -- $c^2$ --
Line 6, replace "example" with -- examples --
Line 22, after "with" delete "a"
Lines 32-33, replace "0.33 a" with -- 0.33a --
Line 33, replace "0.67 a" with -- 0.67a --
Line 39, replace "2 a" with -- 2a --
Line 39, replace "100 a" with -- 100a --
Line 40, replace "5 a" with -- 5a --
Lines 40-41, replace "10 a" with -- 10a --
Line 41, replace "20 a" with -- 20a --
Line 46, replace "practical" with -- practically --
Line 48, replace "2 a" with -- 2a --
Line 54, replace "ϕ" with -- φ --
Line 55, replace "ϕ" with -- φ --in both occurrences

UNITED STATES PATENT AND TRADEMARK OFFICE
CERTIFICATE OF CORRECTION

PATENT NO.   : 6,563,981 B2
DATED        : May 13, 2003
INVENTOR(S)  : Ori Weisberg et al.

It is certified that error appears in the above-identified patent and that said Letters Patent is hereby corrected as shown below:

Column 12, (cont.)
Line 57, replace "the" with -- th --
Line 58, replace "$TX_{lm}$" with -- $TX_{ml}$ --
Lines 64-65, delete "in the"

Column 13,
Line 8, replace "$\phi$" with -- $\varphi$ -- in both occurrences
Line 10, replace "$\phi$" with -- $\varphi$ --
Line 32, replace '$k_t$" with -- $k_j$ --
Line 52, replace "2 a" with -- 2a --

Column 14,
Lines 7 and 49, replace "2 a" with -- 2a --
Lines 32 and 49-50, replace "30 a" with -- 30a --
Line 35, replace "0.22 a" with -- 0.22a --
Line 35, replace "0.78 a" with -- 0.78a --
Line 40, replace "3.02" with -- 13.02 --
Line 49, replace "2 a" with -- 2a --
Line 58, replace "$\phi$" with -- $\varphi$ --

Column 15,
Line 58, replace "$\phi$" with -- $\varphi$ -- in both occurrences
Line 60, replace "$\xi)(\xi$ " with -- $\xi))(\xi$ --
Line 61, replace "$E_{100}$" with -- $E_\varphi$ --
Lines 64 and 65, replace "$\phi$" with -- $\varphi$ --
Line 65, after "addition" insert -- , --

Column 16,
Line 12, delete second occurrence of "of the"
Line 61, replace "40 a" with -- 40a --
Line 63, after "state" insert -- , --

Column 17,
Lines 25, 44, 52 and 53, replace "$\beta$" with -- $\tilde{\beta}$ --
Lines 40 and 42, replace "$\beta$" with -- $\tilde{\beta}$ -- in both occurrences
Line 65, replace "30 a" with -- 30a --

Column 18,
Line 52, replace "$f_{hi} \equiv d_{hi}/a = \tilde{n}_{lo} + \tilde{n}_{hi})$" with -- $f_{hi} \equiv d_{hi}/a = \tilde{n}_{lo}/(\tilde{n}_{lo} + \tilde{n}_{hi})$ --

UNITED STATES PATENT AND TRADEMARK OFFICE
CERTIFICATE OF CORRECTION

PATENT NO. : 6,563,981 B2
DATED : May 13, 2003
INVENTOR(S) : Ori Weisberg et al.

It is certified that error appears in the above-identified patent and that said Letters Patent is hereby corrected as shown below:

Column 20,
Line 2, after "core" insert -- , --
Lines 51, 54, 64 and 65, replace "| n>" with $--|n\rangle--$
Line 55, replace "<m | n>" with $--\langle m|n\rangle--$
Line 56, replace "| ψ>" with $--|\psi\rangle--$ Column 21,
Lines 3-8, replace "$\frac{d}{dz}\alpha_n = i\sum_l C_{nl}\alpha_l e^{i\Delta\beta_{nl}z}$" with $--\frac{d}{dz}\alpha_n = i\sum_l C_{n\ell}\alpha_l e^{i\Delta\beta_{n\ell}z}--$ Lines 8 and 12, replace "$C_{nl}$" with -- $C_{n\ell}$ --
Line 8, replace "| n> and | l>" with $--|n\rangle$ and $|\ell\rangle--$
Line 24, replace "∈" with -- ε --
Lines 32 and 36, replace "φ" with -- φ --
Lines 48 and 53, replace "| n≠0>" with $--|n \neq 0\rangle--$
Line 58, replace "$C_{nl}$" with -- $C_{n\ell}$ --

Column 22,
Line 11, replace "φ" with -- φ --
Line 17, replace "$C_{nl}$" with -- $C_{n\ell}$ --

Column 24,
Line 14, replace "φ" with -- φ --
Line 15, replace "$C_{nl}$" with -- $C_{n\ell}$ --
Line 16, replace "$e$ l[-y/$R_e$Δm]:" with $--e^{i\left(-\frac{\gamma}{R_c}\Delta m\right)z}--$ Column 25
Line 7, replace "=" with -- ≠ --
Line 50, replace "11130" with -- 1130 --

Column 26
Line 11, after "is" delete ","

Column 27
Line 40, replace "φ" with -- φ -- in all three occurrences

UNITED STATES PATENT AND TRADEMARK OFFICE
CERTIFICATE OF CORRECTION

PATENT NO. : 6,563,981 B2
DATED : May 13, 2003
INVENTOR(S) : Ori Weisberg et al.

It is certified that error appears in the above-identified patent and that said Letters Patent is hereby corrected as shown below:

Column 28,
Line 4, replace "φ" with -- ϕ --
Line 5, replace "φ" with -- ϕ -- in both occurrences
Line 11, replace "ol" with -- of --
Line 34, replace "lease" with -- least --

Signed and Sealed this

Thirty-first Day of August, 2004

JON W. DUDAS
*Director of the United States Patent and Trademark Office*